United States Patent
Sheppard et al.

(10) Patent No.: US 10,853,824 B2
(45) Date of Patent: *Dec. 1, 2020

(54) METHODS AND APPARATUS TO APPLY HOUSEHOLD-LEVEL WEIGHTS TO HOUSEHOLD-MEMBER LEVEL AUDIENCE MEASUREMENT DATA

(71) Applicant: The Nielsen Company (US), LLC, New York, NY (US)

(72) Inventors: Michael Sheppard, Brooklyn, NY (US); Jonathan Sullivan, Hurricane, UT (US); Peter Lipa, Tucson, AZ (US); Alejandro Terrazas, Santa Cruz, CA (US)

(73) Assignee: The Nielsen Company (US), LLC, New York, NY (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/168,532

(22) Filed: Oct. 23, 2018

(65) Prior Publication Data
US 2019/0057403 A1    Feb. 21, 2019

Related U.S. Application Data

(63) Continuation of application No. 14/866,233, filed on Sep. 25, 2015, now Pat. No. 10,127,567.

(51) Int. Cl.
*G06Q 30/02*    (2012.01)

(52) U.S. Cl.
CPC ................ *G06Q 30/0201* (2013.01)

(58) Field of Classification Search
CPC ....... H04N 21/25883; H04N 21/44204; H04N 21/44222; H04N 21/4661; H04N 21/4665; H04N 21/4667

(Continued)

(56) References Cited

U.S. PATENT DOCUMENTS 5,481,294 A    1/1996 Thomas et al.
6,122,399 A    9/2000 Moed
(Continued)

OTHER PUBLICATIONS

U.S. Department of Commerce, U.S. Census Bureau, "Design and Methodology: American Community Survey", Technical Report, Issued Apr. 2009, (163 pages).
(Continued)

*Primary Examiner* — Alfonso Castro
(74) *Attorney, Agent, or Firm* — Hanley, Flight & Zimmerman, LLC

(57) ABSTRACT

Methods and apparatus to apply household-level weights to audience measurement data at a household-member level are disclosed. An example method to determine demographics of populations to measure media audiences of populations includes determining demographics for members of a first household of a sub-population. First demographics of a first member of the first household are different than second demographics of a second member of the first household. The example method includes calculating a first household-level weight for the first household based on a demographics distribution of the sub-population and aggregate demographics of a population. The example method includes applying the first household-level weight to the first demographics of the first member, applying the first household-level weight to the second demographics of the second member, and estimating a demographics distribution of the population to measure a media audience of the population based on the weighted first demographics and the weighted second demographics.

20 Claims, 7 Drawing Sheets

(58) Field of Classification Search
USPC .......................................................... 725/18
See application file for complete search history.

(56) References Cited

U.S. PATENT DOCUMENTS

| | | |
|---|---|---|
| 7,890,451 B2 | 2/2011 | Cancel et al. |
| 7,949,639 B2 | 5/2011 | Hunt et al. |
| 7,987,123 B1 | 7/2011 | Gaffney et al. |
| 8,401,979 B2 | 3/2013 | Zhang et al. |
| 8,543,523 B1 | 9/2013 | Palit et al. |
| 8,775,332 B1 | 7/2014 | Morris et al. |
| 8,825,563 B1 | 9/2014 | Kumar et al. |
| 2007/0294729 A1 | 12/2007 | Ramaswamy |
| 2008/0077951 A1 | 3/2008 | Maggio et al. |
| 2008/0300965 A1 | 12/2008 | Doe |
| 2009/0292587 A1 | 11/2009 | Fitzgerald |
| 2010/0191723 A1* | 7/2010 | Perez ................. H04L 45/74 707/723 |
| 2011/0119210 A1 | 5/2011 | Zhang et al. |
| 2012/0072940 A1* | 3/2012 | Fuhrer .................. H04H 60/31 725/13 |
| 2013/0198125 A1 | 8/2013 | Oliver et al. |
| 2013/0204999 A1 | 8/2013 | Lindberg |
| 2014/0089051 A1 | 3/2014 | Piotrowski et al. |
| 2014/0372344 A1 | 12/2014 | Morris et al. |

OTHER PUBLICATIONS

Pew Research Center, "Appendix 1: Survey Methodology", Oct. 5, 2011, [http://www.pewsocialtrends.org/2011/10/05/appendix-1-survey-methodology-5/], retrieved on May 11, 2015, (15 pages).

Real Statistics Using Excel, "Iterative Proportional Fitting Procedure (IPFP)", [http://www.real-statistics.com/matrices-and-iterative-procedures/iterative-proportional-fitting-procedure-ipfp/], retrieved on Nov. 6, 2015 (5 pages).

* cited by examiner

US 10,853,824 B2

METHODS AND APPARATUS TO APPLY HOUSEHOLD-LEVEL WEIGHTS TO HOUSEHOLD-MEMBER LEVEL AUDIENCE MEASUREMENT DATA

RELATED APPLICATION

This patent is a continuation of, claims the benefit of and priority to previously filed U.S. patent application Ser. No. 14/866,233, entitled "METHODS AND APPARATUS TO APPLY HOUSEHOLD-LEVEL WEIGHTS TO HOUSEHOLD-MEMBER LEVEL AUDIENCE MEASUREMENT DATA," filed Sep. 25, 2015. The subject matter of this application is incorporated herein by reference in its entirety.

FIELD OF THE DISCLOSURE

This disclosure relates generally to audience measurement, and, more particularly, to methods and apparatus to apply household-level weights to household-member level audience measurement data.

BACKGROUND

In recent years, audience measurement entities have collected demographic information (e.g., age, race, gender, income, education level, etc.) of a population by having members of a population complete a survey (e.g., door-to-door, mail, online, etc.). Some audience measurement entities also obtain consent from households of a population to collect behavioral data (e.g., viewing data and/or tuning data for television programming, advertising, movies, etc.) from the households. In some instances, the audience measurement entities collect viewing data (e.g., data related to media viewed by a member of the household) from each member of the household. To identify which household member is exposed to displayed media, the audience measurement entities often employ meters (e.g., personal people meters) to monitor the members and/or media output devices (e.g., televisions) of the household.

Some audience measurement entities produce ratings of the displayed media by correlating the collected demographic information with the viewing data. For example, such reports may provide a breakdown of the viewing data grouped by demographic categories.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
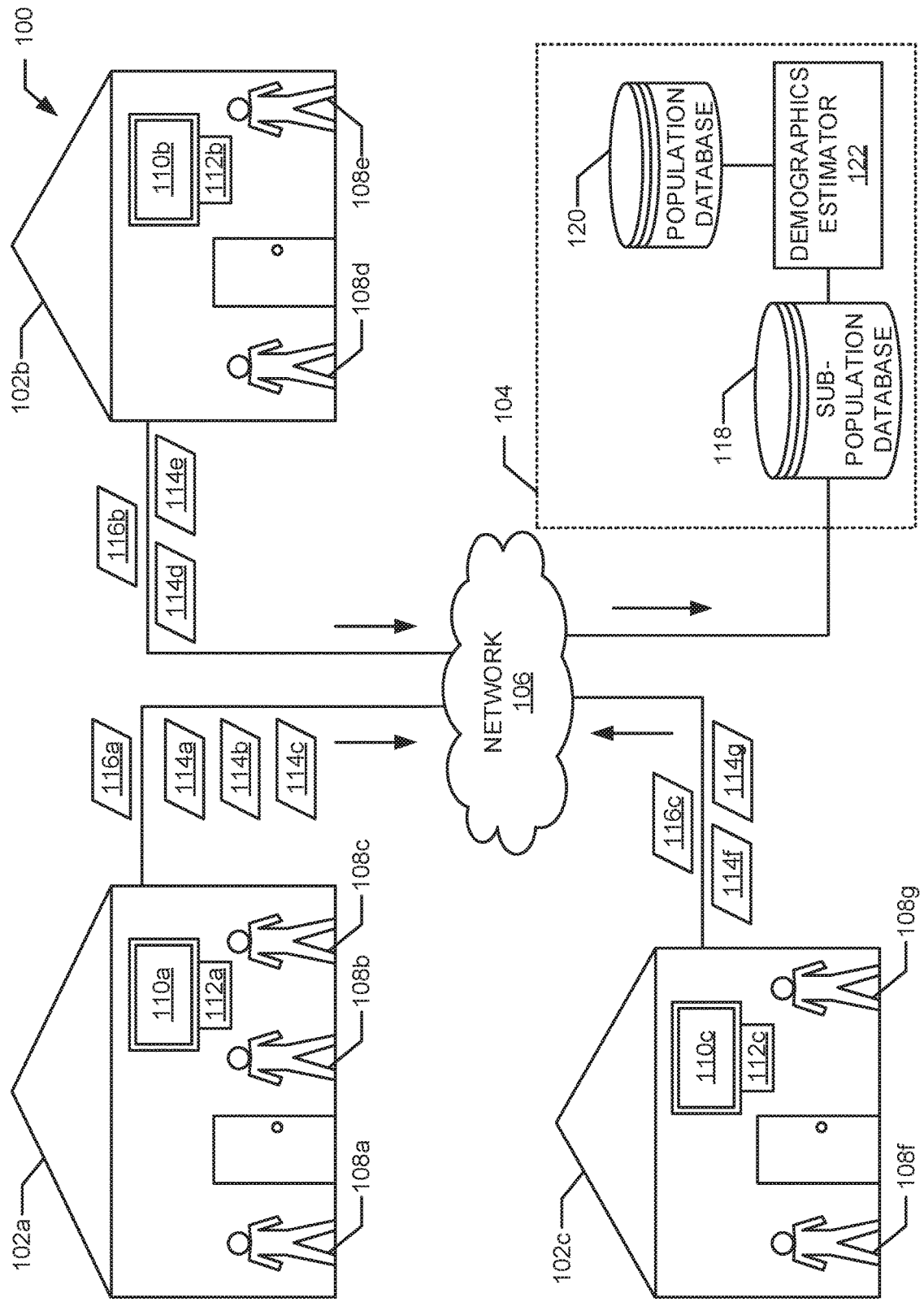
FIG. 1 is a block diagram of an example environment in which audience measurement data is collected and weighted to estimate a demographics distribution of a population in accordance with the teachings of this disclosure.

Example methods and apparatus disclosed herein calculate household-level weights for households of a sub-population based on a demographics distribution of the sub-population and aggregate demographics data of a population. Some disclosed example methods and apparatus utilize the calculated household-level weights and demographics of the sub-population households to estimate a demographics distribution of the population. Some disclosed methods and apparatus utilize the calculated household-level weights to measure an audience of media associated with a tuning event by associating the media with the demographics of the sub-population households and scaling up those demographics by the corresponding household-level weights.

Audience measurement entities (AMEs) and others measure a composition and size of audiences consuming media to produce ratings of the media. Ratings are used by advertisers and/or marketers to purchase advertising space and/or design advertising campaigns. Additionally, media producers and/or distributors use the ratings to determine how to set prices for advertising space and/or to make programming decisions. To measure the composition and size of an audience, AMEs (e.g., The Nielsen Company®) track audience members' exposure to particular media and associate demographics data (e.g., demographics information, demographics) of the audience members with the particular media.

Some demographics data of an audience member and/or an audience associated with particular media includes information regarding multiples types of attributes of the audience member and/or audience. As used herein, each type of attribute or combination of attributes is referred to as a "demographic dimension." For example, demographic dimensions may include age, gender, age and gender, income, race, nationality, geographic location, education level, religion, etc. A particular demographic dimension may include, be made up of and/or be divided into different groupings. As used herein, each grouping of demographic dimensions is referred to as a "demographic marginal," a "demographic group," and/or a "demographic bucket." For example, a highest-education-level demographic dimension may include a high school demographic marginal, an associate's demographic marginal, a bachelor's demographic marginal, a master's demographic marginal, and a doctorate demographic marginal. AMEs and other entities collect demographics data of the audience members through various methods (e.g., via telephone interviews, via online surveys, etc.).

Because collecting demographics information for each audience member of an audience may be impractical and/or prohibitively expensive, some AMEs select a sample population of a population (e.g., a panel, a sub-population of a population, etc.) from which data is collected. The collected data is then extrapolated onto the population to estimate characteristics of the population (e.g., to estimate detailed demographic characteristics of the population). The panelists of the sample population constitute a fraction of the members of the population. As used herein, a "panelist" refers to an audience member who consents to an AME or other entity collecting person-specific data from the audience member. A "panelist household" refers to a household including an audience member who consents to an AME or other entity collecting person-specific data from the audience member and/or other members of the household. For example, AMEs may collect person-specific demographic and/or consumption data of panelists and/or members of panelist households. As used herein, "consumption data" refers to information relating to media exposure events that are presented via a media output device (e.g., a television, a stereo, a speaker, a computer, a portable device, a gaming console, and/or an online media output device, etc.) of a panelist household and are viewed, heard, perceived, etc. by a member of the panelist household.

Enlisting and retaining panelists for audience measurement can be a difficult and costly process for AMEs. For example, AMEs must carefully select and screen panelist households for particular characteristics so that the panelist households are representative of the population as a whole. Further, panelist household members must diligently perform specific tasks to enable the collected demographics and consumption data to accurately reflect the panelist household. For example, to identify that a panelist is consuming a particular media, the AMEs require the panelist to interact with a meter (e.g., a people meter) that monitors a media presentation device of the panelist household. A people meter is an electronic device that is typically positioned in a media access area (e.g., a consumption area such as a living room of the panelist household) and is proximate to and/or carried by one or more panelists. In some examples, the panelist must physically engage with the meter. For example, based on one or more triggers (e.g., a channel change of a media presentation device, an elapsed period of time, etc.), the people meter may generate a prompt for audience members of the panelist household to provide presence and/or identity information by depressing a button of the people meter. Although periodically inputting information in response to a prompt may not be burdensome when required for a short period of time, some people find the prompting and data input tasks to be intrusive and annoying over longer periods of time. As a result, some households, which are otherwise desirable for AMEs to monitor, elect not to be panelist households.

Because collecting information from panelist households can be difficult and costly, some AMEs or other entities collect information from media presentation devices such as set-top boxes. A media presentation device such as a set-top box (STB) is a device that converts source signals into media presented via a media output device such as a television or video montior. In some examples, the media presentation device implements a digital video recorder (DVR) and/or a digital versatile disc (DVD) player. Other types of media presentation devices from which data may be collected include televisions with media tuners and/or media receivers, over-the-top devices (e.g., a Roku media device, an Apple TV media device, a Samsung TV media device, a Google TV media device, a Chromecast media device, an Amazon TV media device, a gaming console, a smart TV, a smart DVD player, an audio-streaming device, etc.), stereos, speakers, computers, portable devices, gaming consoles, online media output devices, radios, etc. Some media presentation devices are capable of recording tuning data corresponding to media output by media presentation devices. As used herein, "tuning data" refers to information pertaining to tuning events (e.g., a STB being turned on or off, channel changes, media stream selections, media file selections, volume changes, tuning duration times, etc.) of a media presentation device of a household. As used herein, tuning data does not include demographics data (e.g., number of household members, age, gender, race, etc.) of the household and/or members of the household and/or members of the household. To collect the tuning data of a media presentation device, an AME or other entity typically obtains consent from the household for such data acquisition. Many households are willing to provide tuning data via a media presentation device, because person-specific information is not collected by the media presentation device and repeated actions are not required of the household members. While collecting tuning data from the panelist households can greatly increase the amount collected data about media exposure, the lack of association between the tuning data and the particular members of the household (e.g., the lack of linking the tuning data to the members of the household that performed the tuning) reduces the value of both the tuning data and demographic data of the members that may be separately collected from the household.

To enable AMEs and other entities to accurately estimate demographics of a population (e.g., a population as a whole) based on tuning data of a sub-population, the example methods and apparatus disclosed below calculate a subgroup-level weight for a subgroup of the sub-population and apply the subgroup-level weight to each member of the subgroup. For example, to estimate a demographics distribution of the population, disclosed methods and apparatus calculate a household-level weight (e.g., a subgroup-level weight) for a respective household (e.g. a subgroup) of the sub-population based on a demographics distribution of the sub-population and aggregate demographics data of the population. The example methods and apparatus apply the calculated household-level weight to demographics of members of the corresponding household of the sub-population (e.g., the demographics of the members of the non-panelist household are multiplied or scaled up by the calculated household-level weight). Based on the weighted demographics of the non-panelist household, the example methods and apparatus estimate the demographics distribution of the population. For example, to estimate the demographics distribution of the population, the demographics of the members of the households are multiplied by the corresponding household-level weights to scale up the demographics distribution of the sub-population to the aggregate demographics data of the population.

As used herein, a "demographics distribution" refers to a number and/or percentage of a population (e.g., a sub-population, a population as a whole) that belong to demographic constraint(s) of interest. As used herein, a "demographic constraint" refers to a demographic marginal, a demographic joint-marginal, or a demographic joint of a population (e.g., a sub-population, a population as a whole) and/or a member of a population (e.g., a sub-population, a population as a whole). As used herein, a "demographic joint" refers to a combination of demographic marginals in which each demographic dimension of interest is represented. As used herein, a "demographic joint-marginal" refers to a combination of demographic marginals in which less than all demographic dimensions of interests are represented. For example, if the demographic dimensions of interest are age, gender, and education level, an example demographic joint represents 18-35 year-old males with a high-school level education and an example demographic joint-marginal represents males with a high-school level education. Thus, an example demographics distribution includes a number of members of a first demographic constraint (e.g., 18-39 year-old males) and a number of members of a second demographic constraint (e.g., 18-39 year-old females). In some examples, a demographics distribution of a sub-population is partitioned at a household level. For example, an example demographics distribution indicates that a first household includes three 18-39 year-old males and a second household includes zero 18-39 year-old males.

As used herein, "aggregate demographics data" refers to non-person-specific data of the population that indicates a number and/or percentage of population members that belong to demographic constraint(s) of interest. The aggregate demographics data of a population may be collected via a survey-based census (e.g. a government-funded census, a privately-funded census) of the population.

Upon estimating the demographics distribution of the population, example methods and apparatus disclosed herein utilize the calculated household-level weights to measure an audience of a media event by associating the media event with the demographics of the sub-population households and scaling up those demographics using the corresponding household-level weights. For example, if viewing data is collected identifying that a member of a sub-population household consumed (e.g., viewed) a media event of interest, example methods and apparatus associate (e.g., correlate, link, affiliate, etc.) demographics of that member with the viewing event and scale up the demographics of that member by the calculated household-level weight of the corresponding household to measure an audience of the media event (e.g., ratings).

If tuning data is collected identifying that a media presentation device of a sub-population household was tuned to a media event (e.g., a tuning event), example methods and apparatus disclosed herein associate (e.g., correlate, link, affiliate, etc.) demographics of each member of that household with the media event and scale up the demographics of each member of that household by the corresponding calculated household-level weight to measure an audience of the media event (e.g., ratings). Thus, the example methods and apparatus enable an AME or other entity to apply household-level weights at a household-member level (e.g., the same weight is applied to monitoring data associated with each member of the household) to accurately estimate behavioral characteristics (e.g., media viewership) of the population based on tuning data of the sub-population. For example, to produce ratings for displayed media based on data collected from the sub-population (e.g., a sample population), tuning data of a sub-population household is scaled up or multiplied by the household-level weight without having to identify which member of the household is associated with a tuning event of the tuning data. Thus, the disclosed methods and apparatus enable an AME to accurately produce ratings of displayed media based on a sample population without having to collect consumption data, employ people meters and/or calculate weights on a household-member level.

To calculate household-level weights associated with households of a sub-population, a constraint matrix is constructed based on the demographics distribution of the sub-population and a target value total vector is constructed based on the aggregate demographics data of the population. An iterative proportional fitting (IPF) process is applied to the constraint matrix and the target value total vector to calculate the household-level weights of the sub-population. For example, the IPF process iteratively adjusts weight values based on the constraint matrix and the target value total vector until the weight values represent household-level weights associated with the respective households of the sub-population.

Disclosed example methods to determine demographics of populations to measure media audiences of populations include determining, via a processor, demographics for members of a first household of a sub-population. In the example methods, first demographics of a first member of the first household are different than second demographics of a second member of the first household. The example methods also include calculating, via the processor, a first household-level weight for the first household based on a demographics distribution of the sub-population and aggregate demographics of a population. The population includes the sub-population. The example methods also include applying, via the processor, the first household-level weight to the first demographics of the first member of the first household and applying, via the processor, the first household-level weight to the second demographics of the second member of the first household. The example methods also include estimating, via the processor, a demographics distribution of the population to measure a media audience of the population based on the weighted first demographics and the weighted second demographics.

Some example methods include determining, via the processor, demographics for members of a second household of the sub-population. Third demographics of a first member of the second household are different than fourth demographics of a second member of the second household. Such example methods also include calculating, via the processor, a second household-level weight for the second household based on the demographics distribution of the sub-population and the aggregate demographics of the population. Such example methods also include applying, via the processor, the second household-level weight to the third demographics of the first household member of the second household and applying, via the processor, the second household-level weight to the fourth demographics of the second household member of the second household. Such example methods also include estimating, via the processor, the demographics distribution of the population based on the weighted third demographics and the weighted fourth demographics.

In some example methods, the first demographics of the first member of the first household includes a first demographic constraint associated with the first member and the second demographics of the second member of the first household includes a second demographic constraint associated with the second member. In some such example methods, applying the first household-level weight to the first demographics of the first member includes applying the first household-level weight to the first demographic constraint and applying the first household-level weight to the second demographics of the second member includes applying the first household-level weight to the second demographic constraint.

Some example methods further include associating a tuning event of the first household with the first household-level weight, associating the tuning event with the first demographics of the first member and the second demographics of the second member, and scaling up the tuning event by the first household-level weight to measure an audience of the tuning event.

In some example methods, calculating the demographics distribution of the sub-population includes constructing a constraint matrix based on the demographics of the members of the sub-population. In some such example methods, constructing the constraint matrix includes assigning the first household as a column of the constraint matrix, assigning a demographic constraint as a row of the constraint matrix, and inserting a value indicative of a quantity of members of the first household associated with the demographic constraint as an element in the column and the row of the constraint matrix. In some such example methods, calculating the first household-level weight for the first household includes receiving an initial weight for the first household, creating a target value total based on the aggregate demographics data of the population, and performing an iterative proportional fitting based on the constraint matrix, the initial weight, and the target value total.

In some example methods, calculating and applying the first household-level weight reduces an amount of computations executed by the processor to estimate the demographics distribution of the population by not calculating individual-level weights for the members of the sub-population and to measure an audience of the population by utilizing tuning data collected from the sub-population households without collecting consumption data from the members of the sub-population.

In some example methods, applying the first household-level weight to the first demographics of the first member includes multiplying the first demographics by the first household-level weight and applying the first household-level weight to the second demographics of the second member includes multiplying the second demographics by the first household-level weight. The weighted first demographics represent a first quantity of members of the population having the first demographics, and the weighted second demographics represent a second quantity of members of the population having the second demographics.

In some example methods, the processor includes at least a first processor of a first hardware computer system and a second processor of a second hardware computer system.

Disclosed example apparatus to determine demographics of populations to measure media audiences of populations include a sub-population determiner to determine demographics for members of a first household of a sub-population. In the example methods, first demographics of a first member of the first household are different than second demographics of a second member of the first household. The example apparatus also include a weight calculator to calculate a first household-level weight for the first household based on a demographics distribution of the sub-population and aggregate demographics data of a population. The population includes the sub-population. The example apparatus also include a population predictor to apply the first household-level weight to the first demographics of the first member of the first household, apply the first household-level weight to the second demographics of the second member of the first household, and estimate a demographics distribution of the population to measure a media audience of the population based on the weighted first demographics and the weighted second demographics.

In some example apparatus, the sub-population determiner is to determine demographics for members of a second household of the sub-population. Third demographics of a first member of the second household are different than fourth demographics of a second member of the second household. The weight calculator is to calculate a second household-level weight for the second household based on the demographics distribution of the sub-population and aggregate demographics data of a population. The population predictor is to apply the second household-level weight to the third demographics of the first member of the second household, apply the second household-level weight to the fourth demographics of the second member of the second household, and estimate the demographics distribution of the population based on the weighted third demographics and the weighted fourth demographics.

In some example apparatus, the first demographics of the first member of the first household includes a first demographic constraint associated with the first member and the second demographics of the second member of the first household includes a second demographic constraint associated with the second member. In some such example apparatus, to apply the first household-level weight to the first demographics of the first household, the population predictor is to apply the first household-level weight to the first demographic constraint and, to apply the first household-level weight to the second demographics of the second member, the population predictor is to apply the first household-level weight to the second demographic constraint.

In some examples apparatus, the population predictor is to associate a tuning event of the first household with the first household-level weight, associate the tuning event with the first demographics of the first member and the second demographics of the second member, and scale up the tuning event by the first household-level weight to measure an audience of the tuning event.

In some example apparatus, to calculate the demographics distribution of the sub-population, the sub-population determiner is to construct a constraint matrix based on the demographics of the members of the sub-population. In some such example apparatus, to construct the constraint matrix, the sub-population determiner is to assign the first household as a column of the constraint matrix, assign a demographic constraint as a row of the constraint matrix, and insert a value indicative of a quantity of members of the first household associated with the demographic constraint as an element in the column and the row of the constraint matrix. In some such example apparatus, to calculate the first household-level weight for the first household, the weight calculator is to receive an initial weight for the first household, create a target value total based on the aggregate demographics data of the population, and perform an iterative proportional fitting based on the constraint matrix, the initial weight, and the target value total.

In some example apparatus, the weight calculator is to calculate the first household-level weight and the population predictor is to apply the first household-level weight to reduce an amount of computations executed by a processor to estimate the demographics distribution of the population by not calculating individual-level weights for the members of the sub-population to estimate the demographics distribution of the population and to measure an audience of the population by utilizing tuning data collected from the sub-population without collecting consumption data from the members of the sub-population.

In some example apparatus, the population predictor is to apply the first household-level weight to the first demographics of the first member by multiplying the first demographics by the first household-level weight. The weighted first demographics represent a first quantity of members of the population having the first demographics. The population predictor is to apply the first household-level weight to the second demographics of the second member by multiplying the second demographics by the first household-level weight. The weighted second demographics represent a second quantity of members of the population having the second demographics.

Turning to the figures, FIG. 1 illustrates an example environment 100 in which audience measurement data is collected and weighted to estimate a demographics distribution of a population. In the illustrated example, the environment 100 includes an example sub-population (e.g., a sample population) that includes example households 102a, 102b, 102c. As illustrated in FIG. 1, the example environment 100 includes an audience measurement entity (AME) 104 that estimates the demographics distribution of the population based on data of the households 102a, 102b, 102c of the sub-population and a network 106 that communicatively couples the households 102a, 102b, 102c of the sub-population to the AME 104.

The households 102a, 102b, 102c of the illustrated example are panelist households of a sub-population (e.g., a panel, a sample population, etc.) from which data is collected to estimate characteristics (e.g., detailed demographic characteristics, behavioral characteristics, etc) of the population. According to the illustrated example, the panelist households (e.g., the households 102a, 102b, 102c) of the sample population constitute a fraction of the households of the population. The example households 102a, 102b, 102c are representative of many other households of the sample population. In some examples, characteristics of the other households are similar to and/or are different from those of the representative households 102a, 102b, 102c. For example, other households of the sub-population may include one member, three members, five members, etc. The households (e.g., the households 102a, 102b, 102c) of the sample population may be enlisted using any desired methodology (e.g., random selection, statistical selection, phone solicitations, Internet advertisements, surveys, advertisements in shopping malls, product packaging, etc.).

The panelist households 102a, 102b, 102c of the illustrated example include members (e.g., panelist household members) of the sub-population. For example, the household 102a includes members 108a, 108b, 108c, the household 102b includes members 108d, 108e, and the household 102c includes members 108f, 108g. Further, as illustrated in FIG. 1, the households 102a, 102b, 102c of the sub-population include media output devices (e.g., televisions, stereos, speakers, computers, portable devices, gaming consoles, and/or an online media output devices, etc.) that display media (e.g., television programming, movies, advertisements, Internet-based programming such as websites, etc.) to the members 108a, 108b, 108c, 108d, 108e, 108f, 108g of the respective sub-population households 102a, 102b, 102c. For example, the household 102a includes a television 110a for displaying media, the household 102b includes a television 110b for displaying media, and the household 102c includes a television 110c for displaying media. The televisions 110a, 110b, 110c are communicatively coupled to respective meters 112a, 112b, 112c (e.g., stationary meters, set-top box meters, etc.) that are placed in, on, under, and/or near the televisions 110a, 110b, 110c to monitor tuned media. In some examples, the household 102a, the household 102b, the household 102c and/or any other household of the sub-population include more than one media output device and/or meter.

In the environment 100 of the illustrated example, demographics data 114a, 114b, 114c, 114d, 114e, 114f, 114g is determined for the respective members 108a, 108b, 108c, 108d, 108e, 108f, 108g of the households 102a, 102b, 102c of the sub-population. For example, the demographics data 114a, 114b, 114c, 114d, 114e, 114f, 114g includes information regarding demographic constraints (e.g., demographic marginals, demographic joint-marginals, demographics joints that include gender, occupation, salary, race and/or ethnicity, marital status, highest completed education, and/or current employment status, etc.) of the respective members 108a, 108b, 108c, 108d, 108e, 108f, 108g. For example, the demographics data 114a may indicate that the member 108a is a male, age 51, that is married, and has a bachelor's degree. In some examples, the demographics data 114a, 114b, 114c, 114d, 114e, 114f, 114g are determined through various methods during an enrollment process (e.g., via telephone interviews, via online surveys, via door-to-door surveys etc.) of the corresponding households 102a, 102b, 102c.

The meters 112a, 112b, 112c of the illustrated example collect information pertaining to tuning events (e.g., a set-top box being turned on or off, channel changes, volume changes, tuning duration times, etc.) associated with the televisions 110a, 110b, 110c of the respective households 102a, 102b, 102c. For example, the meter 112a collects tuning data 116a associated with the household 102a, the meter 112b collects tuning data 116b associated with the household 102b, and the meter 112c collects tuning data 116c associated with the household 102c. The tuning data 116a, 116b, 116c of the illustrated example does not indicate which, if any, members (e.g., the members 108a, 108b, 108c, 108d, 108e, 108f, 108g) of the sub-population consumed the media associated with the tuning events. For example, the tuning data 116a collected via the meter 112a indicates which media is displayed via the television 110a but does not indicate which, if any, of the members 108a, 108b, 108c consumed the presented media.

In other examples, the meters 112a, 112b, 112c of the illustrated example collect information pertaining to media events in which the members 108a, 108b, 108c, 108d, 108e, 108f, 108g of the respective households 102a, 102b, 102c consumed (e.g., viewed) media presented by the televisions 110a, 110b, 110c of the households 102a, 102b, 102c. In some such examples, the meters 112a, 112b, 112c are people meters (e.g., personal people meters) that collect consumption data (e.g., viewing data) identifying which of the members 108a, 108b, 108c, 108d, 108e, 108f, 108g are present when the televisions 110a, 110b, 110c present a media event. For example, the collected consumption data identify which, if any, members (e.g., the members 108a, 108b, 108c, 108d, 108e, 108f, 108g) of the sub-population consumed the media event of interest.

According to the illustrated example, watermarks, metadata, signatures, etc. collected and/or generated by the meters 112a, 112b, 112c for use in identifying the media and/or a station that transmits the media are part of media exposure data collected by the meters 112a, 112b, 112c.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s)(e.g., the audio and/or video signals forming the media presentation being monitored). A signature may be a series of signatures collected in series over a timer interval. A good signature is repeatable when processing the same media presentation, but is unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more references signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature that with matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

As illustrated in FIG. 1, the demographics data 114a, 114b, 114c, 114d, 114e, 114f, 114g associated with the respective sub-population members 108a, 108b, 108c, 108d, 108e, 108f, 108g and the tuning data 116a, 116b, 116c associated with the respective meters 112a, 112b, 112c are collected by the AME 104 via the network 106 (e.g., the Internet, a local area network, a wide area network, a cellular network, etc.) and wired and/or wireless connections (e.g., a cable/DSL/satellite modem, a cell tower, etc.).

The AME 104 of the illustrated example includes a sub-population database 118, a population database 120, and a demographic estimator 122. The sub-population database 118 of the illustrated example stores the collected demographics data 114a, 114b, 114c, 114d, 114e, 114f, 114g and the collected tuning data 116a, 116b, 116c. In some examples, the sub-population database 118 stores tuning data of a household in association with demographics data of members of the same household. For example, the tuning data 116a and the demographics data 114a, 114b, 114c are stored in association with the household 102a. The example tuning data 116b and demographics data 114d, 114e are stored in association with the household 102b. The example tuning data 116c and the demographics data 114f, 114g are stored in association with the household 102c.

In the illustrated example, the population database 120 stores demographics data associated with the population. In some examples, the demographics data of the population is collected via a survey-based census (e.g. a government-funded census, a privately-funded census). The demographics data stored in the example population database 120 include information regarding demographic constraints (e.g., demographic marginals, demographic joint-marginals, demographics joints, etc.) of the population but do not include member-specific information of the members of the population. According to the illustrated example, the demographics data stored in the population database 120 indicate counts (e.g., quantities) of members of the population that belong to demographic constraints (e.g., a count of females, a count of males, a count of young adults, a count of middle-aged adults, and a count of seniors, etc.) but do not indicate which members of the population belong to those demographic constraints. For example, the demographic constraints of the population database 120 may be the same demographic constraints (e.g., a "female" constraint, a "male" constraint, a "young adults" constraint, a "middle-aged adults" constraint, a "seniors" constraint) as the sub-population database 118. In such examples, the demographics data stored in the sub-population database 118 (e.g., demographics data 114a, 114b, 114c, 114d, 114e, 114f, 114g) provide a percentage or count of sub-population members belonging to a demographic constraint of interest (e.g., the "female" constraint) that also belong to another demographic constraint of interest (e.g., the "young adults" constraint, the "middle-aged adults" constraint, the "seniors" constraint). In contrast, the demographics data stored in the population database 120 do not provide a percentage or count of population members that belong to both a demographic constraint of interest (e.g., the "female" constraint) and another demographic constraint of interest (e.g., the "young adults" constraint, the "middle-aged adults" constraint, and the "seniors" constraint). For example, the demographics data stored in the sub-population database 118 provide a percentage or count of sub-population members belonging to a "young-adult female" demographic constraint, whereas the demographics data stored in the population database 120 provide a percentage or count of population members belonging to a "young-adult" demographics constraint and another percentage or count of population members belonging to a "female" demographic constraint.

The demographics estimator 122 of the illustrated example estimates a demographics distribution of the population based on the demographics data stored in the example sub-population database 118 and the demographics data stored in the example population database 120.

To estimate the demographic distribution of the population, the example demographics estimator 122 calculates a demographics distribution of the sub-population based on the demographics data of the sub-population database 118. For example, the demographics distribution of the sub-population indicates a number (e.g., a count, a value indicative of a quantity, a percentage) of sub-population members that belong to demographic constraints of interest (e.g., values indicative of quantities of the sub-population members that satisfy the "female" demographic constraint, the "male" demographic constraint, the "young adult" demographic constraint, the "middle-aged adult" demographic constraint, and the "senior" demographic constraint). In some examples, the demographics distribution of the sub-population is partitioned at a household level (e.g., includes values indicative of quantities of members if the households 102a, 102b, 102c belonging to the "female" demographic constraint).

Further, the demographics estimator 122 of the illustrated example aggregates the demographics data of the population database 120. The aggregate demographics data indicates a value indicative of a quantity (e.g., a total number and/or percentage) of the members of the population that belong to particular demographic constraint(s) of interest (e.g., females, males, young adults, middle-aged adults, seniors, etc.). In some examples, the demographic constraints of the aggregate demographics data of the population are the same demographic constraints as the demographic constraints of the demographics distribution of the sub-population.

Based on the demographics distribution of the sub-population and the aggregate demographics data of the population, the example demographics estimator 122 calculates household-level weights for the respective households of the sub-population. For example, as disclosed in further detail in connection with the weight calculator 206 of FIG. 2 and the machine readable instructions 318 of FIG. 6, the demographics estimator 122 calculates a first household-level weight for the household 102a, a second household-level weight for the household 102b, and a third household-level weight for the household 102c.

To estimate a demographics distribution of the population, the demographics estimator 122 of the illustrated example applies the household-level weights of the corresponding households to demographics data of the members of those households by multiplying the demographics data of the members by the corresponding household-level weights. For example, the demographics estimator 122 multiplies the demographics data 114a of the member 108a, the demographics data 114b of the member 108b, and the demographics data 114c of the member 108c by the household-level weight of the household 102a. By multiplying the demographics data of each member of the sub-population by the household-level weight associated with the respective household (e.g., multiply the demographics data 114a with the household-level weight of the household 102a, multiply the demographics data 114d with the household-level weight of the household 102b, multiply the demographics data 114f with the household-level weight of the household 102c, etc.), the demographics estimator 122 scales up the demographics distribution of the sub-population to estimate a demographics distribution of the population. The demographics estimator 122 applies a household-level weight associated with a household (e.g., the household 102b) to demographics data associated with each of the household members (e.g., the demographics data of the member 108d and the demographics data of the member 108e) regardless of the demographic constraints of the members of that household. For example, the same household-level weight is applied to the demographics data of the member 108d and the demographics data of the member 108e even if the demographics data of the member 108d is different than the demographics data of the member 108e.

For example, the demographics distribution of the population estimated by the demographics estimator 122 includes distributions for the demographic constraints of the aggregate demographic data (e.g., females, males, young adults, middle-aged adults, seniors, etc.) that the demographics estimator 122 utilized to calculate the household-level weights. Additionally or alternatively, the example demographics estimator 122 calculates a demographics distribution of the population for other demographic constraints (e.g., demographic constraints related to other demographic dimensions such as income, race, marital-status, nationality, geographic location, education level, religion, etc.).

The example demographics estimator 122 of FIG. 1 associates (e.g., correlates, links, affiliates, etc.) tuning data of a panelist household (e.g., the tuning data 116b of the household 102b) with the household-level weight of that household. Further, the demographics estimator 122 associates (e.g., correlates, links, affiliates, etc.) the tuning data of that panelist household (e.g., the tuning data 116b of the household 102b) with demographics data of members of that household (e.g., the demographics data 114d of the member 108d and the demographics data 114e of the member 108e of the household 102b). The example demographics estimator 122 applies (e.g., multiplies, scales up) the demographics data of each member of the households by the corresponding household level weights. For example, the demographics estimator 122 scales up the demographics data 114d of the member 108d (e.g., a white, middle-aged male) and the demographics data 114e of the member 108e (e.g., a black, middle-aged female) equally by the same household-level weight of the household 102b even though the members 108d, 108e have different demographics. Because the tuning data of the tuning events (e.g., the tuning data 116b) of the households (e.g., the household 102b) are associated (e.g., correlated, linked, affiliated, etc.) with the demographics data (e.g., the demographics data 114d, 114e) of the members (e.g., the members 108d, 108e) of those households, the demographics estimator 122 measures an audience of the tuning event for the population by applying the household-level weights without having to determine which of the panelist members is responsible for the tuning event. Thus, the example demographics estimator 122 accurately produces ratings of media based on tuning data (e.g., the tuning data 116a, 116b, 116c) of panelist households (e.g., the households 102a, 102b, 102c) of a sample population without having to collect viewing data, enlist panelist households, employ people meters and/or calculate weights for each member (e.g., the members 108a, 108b, 108c, 108d, 108e, 108f, 108g) of the sample population.

In operation, the example demographics data 114a, 114b, 114c, 114d, 114e, 114f, 114g is collected from the example members 108a, 108b, 108c, 108d, 108e, 108f, 108g of the example panelist households 102a, 102b, 102c of the sub-population. The demographics data 114a, 114b, 114c, 114d, 114e, 114f, 114g is sent to the example AME 104 via the example network 106 and stored by the example sub-population database 118 of the AME 104. The example meters 112a, 112b, 112c of the respective panelist households 102a, 102b, 102c collect the example tuning data 116a, 116b, 116c associated with tuning events of the meters 112a, 112b, 112c and/or the media output devices 110a, 110b, 110c of the respective households 102a, 102b, 102c. The tuning data 116a, 116b, 116c is sent to the sub-population database 118 of the AME 104 via the network 106. Further, the population database 120 of the AME 104 stores aggregate demographics data of the population.

Based on the collected demographics data 114a, 114b, 114c, 114d, 114e, 114f, 114g, the example demographics estimator 122 of the AME 104 calculates a demographics distribution of the sub-population. The demographics estimator 122 calculates household-level weights for the subpopulation based on the demographics distribution of the sub-population and the aggregate demographics data of the population.

To estimate a demographics distribution of the population, the example demographics estimator 122 applies (e.g., multiplies, scales up) the demographics data 114a, 114b, 114c, 114d, 114e, 114f, 114g of the corresponding members 108a, 108b, 108c, 108d, 108e, 108f, 108g by the household-level weights of the respective households 102a, 102b, 102c. To calculate an audience measurement and/or to produce media presentation ratings, the demographics estimator 122 associates (e.g., correlates, links, affiliates, etc.) tuning events of the tuning data 116a, 116b, 116c of the corresponding households 102a, 102b, 102c with the demographics data 114a, 114b, 114c, 114d, 114e, 111f, 114g of the respective household members 108a, 108b, 108c, 108d, 108e, 108f, 108g and scales up the demographics data 114a, 114b, 114c, 114d, 114e, 111f, 114g by the household-level weights to measure an audience of the population for the tuning event.

Calculating and applying the household-level weights at a household-member level provides a solution to the technological problem of estimating a demographics distribution of a population based on reducing an amount of computations executed by a processor by utilizing aggregate demographic data of the population and a demographics distribution of a sub-population collected from computer networked data collection systems. Further calculating and applying the household-level weights at a household-member level provides a solution to the technological problem of reducing an amount of computations executed by a processor to measure an audience of the population for a media event by utilizing tuning data collected from computer networked data collection systems, for example, without collecting consumption data from the sub-population members. Thus, less processor utilization and network bandwidth consumption is achieved by the disclosed methods and apparatus that utilize information collected from a sub-population (e.g., a sub-population that includes fewer people than a total population).

Figure 2:
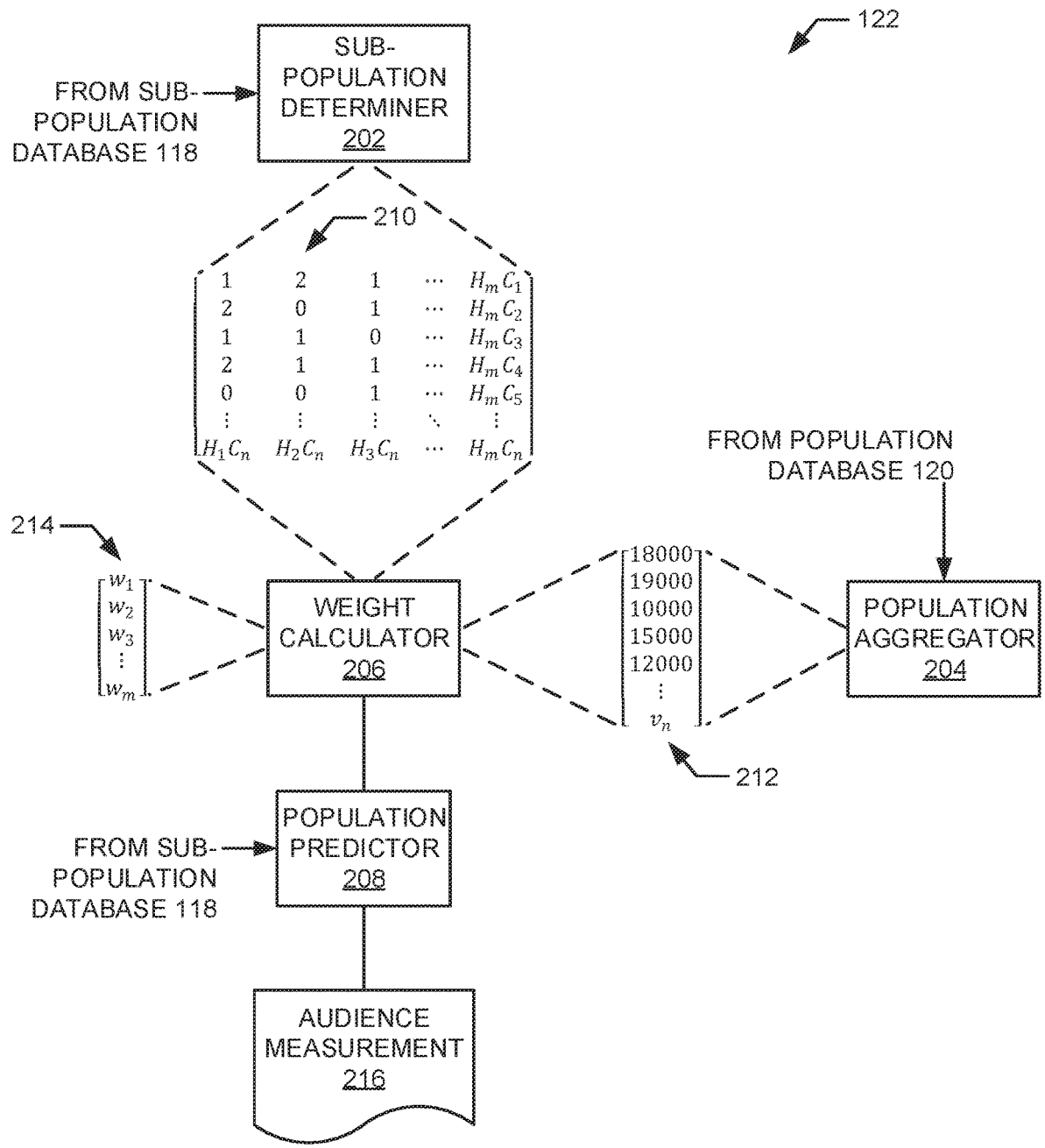
FIG. 2 is a block diagram of an example implementation of the demographics estimator of FIG. 1 that is to estimate a demographics distribution of a population.

FIG. 2 is a block diagram of an example implementation of the demographics estimator 122 of FIG. 1 that is to estimate the demographics distribution of the population. As illustrated in FIG. 2, the example demographics estimator 122 includes a sub-population determiner 202, a population aggregator 204, a weight calculator 206, and a population predictor 208.

In the illustrated example, the sub-population determiner 202 collects demographics data of the members of the example sub-population from the example sub-population database 118 of FIG. 1. For example, the sub-population determiner 202 collects the demographics data 114a, 114b, 114c of the respective members 108a, 108b, 108c of the household 102a, the demographics data 114d, 114e of the respective members 108d, 108e of the household 102b, and the demographics data 114f, 114g of the respective members 108f, 108g of the household 102c. In some examples, the sub-population determiner 202 obtains the demographics data 114a, 14b, 114c, 114d, 114e, 114f, 114g of the population from the sub-population database 118 via a network (e.g., the Internet, a local area network, a wide area network, a cellular network, etc.) and wired and/or wireless connections (e.g., a cable/DSL/satellite modem, a cell tower, etc.).

The sub-population determiner 202 of the illustrated example constructs an example constraint matrix 210 based on the data collected from the example sub-population database 118. As illustrated in FIG. 2, columns of the example constraint matrix 210 represent respective panelist households of the sub-population, rows of the example represent respective demographic constraints of interest, and elements of the example indicate a value indicative of a quantity of members of the corresponding households that belong to the corresponding demographic constraints. Thus, the constraint matrix 210 represents a demographic distribution of the sub-population. In other examples, the constraint matrix 210 includes columns representative of demographic constraints of interest, rows representative of panelist households, and elements indicative of a value indicative of a quantity of members of the corresponding households that belong to the corresponding demographic constraints.

As illustrated in FIG. 2, the example constraint matrix 210 includes m-number of panelist households and n-number of demographic constraints of interest. In the illustrated example, a first column of the example constraint matrix 210 represents the panelist household 102a, a second column represents the panelist household 102b, and a third column represents the panelist household 102c. A first row represents a "male" demographic constraint, a second row represents a "female" demographic constraint, a third row represents a "young adult" demographic constraint a fourth row represents a "middle-aged adult" demographic constraint, and a fifth row represents a "senior" demographic constraint. Thus, the rows of the illustrated example represent demographic marginals of a "gender" demographic dimension (e.g., a "male" demographic marginal and a "female" demographic marginal) and demographic marginals of an "age" demographic dimension (e.g., a "young adult" demographic marginal, a "middle-aged adult" demographic marginal, and a "senior" demographic marginal). Further, the example constraint matrix 210 of FIG. 2 indicates that the household 102a includes 1 "male" member, 2 "female" members, 1 "young-adult" member, 2 "middle-aged" members, and 0 "senior" members; the household 102b includes 2 "male" members, 0 "female" members, 1 "young-adult" member, 1 "middle-aged" member, and 0 "senior" members; and the household 102c includes 1 "male" member, 1 "female" member, 0 "young-adult" members, 1 "middle-aged" member, and 1 "senior" member.

Additionally or alternatively, the constraint matrix 210 of the illustrated example may include demographic constraints associated with other demographic marginals (e.g., income, race, nationality, geographic location, education level, religion, etc.), with demographic joint-marginals (e.g., a gender/race/income demographic joint-marginal), with demographic joints (e.g., a gender/race/income/education-level demographic joint), and/or any combination thereof. For example, the constraint matrix 210 may include a demographic constraint that is a combination of a "male in Michigan" demographic constraint, a "20-30 year-old female in Ohio" demographic constraint, and "50+ year-old, divorced male in Maryland" demographic constraint. The example constraint matrix 210 may also include a "male in a three-member, two-television household" constraint. In some examples, the demographic constraints included in the constraint matrix 210 are determined by evaluating which demographic constraints are included in the data of the sub-population database 118 and the population database 120 of FIG. 1.

The population aggregator 204 of the illustrated example collects aggregate demographics data of the population from the example population database 120 of FIG. 1. As illustrated in FIG. 2, the example population aggregator 204 constructs an example target value total vector 212 based on the collected aggregate demographics data. The elements of the example target value total vector 212 represent numbers and/or percentages of members of the population that belong to demographic constraints of interest. The example target value total vector 212 includes n-number of demographic constraints. Thus, in the illustrated example, the number of demographic constraints of the target value total vector 212 is the same as the number of demographic constraints of the constraint matrix 210.

Further, in the illustrated example, the demographic constraints of the target value total vector 212 are the same demographic constraints as the constraint matrix 210. For example, a first row of the target value total vector 212 of FIG. 2 represents a "male" demographic constraint, a second row represents a "female" demographic constraint, a third row represents a "young-adult" demographic constraint a fourth row represents a "middle-aged" demographic constraint, and a fifth row represents a "senior" demographic constraint. In the illustrated example, the data of the target value total vector 212 indicates that the population includes 18,000 males, 19,000 females, 10,000 young adults, 15,000 middle-aged adults, and 12,000 seniors. Thus, the rows of the example target value total vector 212 represent demographic marginals of a "gender" demographic dimension (e.g., a "male" demographic marginal and a "female" demographic marginal) and demographic marginals of an "age" demographic dimension (e.g., a "young adult" demographic marginal, a "middle-aged adult" demographic marginal, and a "senior" demographic marginal). Additionally or alternatively, the constraint target value total vector 212 of the illustrated example may include demographic constraints associated with other demographic marginals (e.g., an "education" demographic dimension), with demographic joint-marginals (e.g., a joint marginal including a "gender" demographic dimension and an "age" demographic dimension), with demographic joints (e.g., a joint including a "gender" demographic dimension, an "age" demographic dimension, and an "education demographic dimension), and/or with any combination thereof. For example, the target value total vector 212 may include a demographic constraint that is a combination of a "male in Michigan" demographic constraint, a "20-30 year-old female in Ohio" demographic constraint, and "50+ year-old, divorced male in Maryland" demographic constraint. The example target value total vector 212 may also include a "male in a three-member, two-television household" constraint.

As illustrated in FIG. 2, the demographic dimensions represented in the target value total vector 212 indicate that the population includes 37,000 members. For example, the 18,000 males and 19,000 females of the "gender" demographic dimension total 370,000 population members. Likewise, the 10,000 young adults, 15,000 middle-aged adults, and 12,000 seniors of the "age" demographic dimension total 370,000 population members.

As illustrated in FIG. 2, the example weight calculator 206 receives the example constraint matrix 210 from the example sub-population determiner 202 and the target value total vector 212 from the example population aggregator 204. Further, the example weight calculator 206 receives a weight vector 214.

The weight vector 214 of the illustrated example includes weight values that are associated with respective panelist households of the constraint matrix 210. For example, a first weight value, $w_1$, of the example weight vector 214 is associated with the household 102a of the sub-population (e.g., which is represented by the first column of the constraint matrix 210), a second weight value, $w_2$, is associated with the household 102b (e.g., which is represented by the second column of the constraint matrix 210), a third weight value, $w_3$, is associated with the household 102c (e.g., which is represented by the second column of the constraint matrix 210), etc.

The weight values of the weight vector 214 represent initial estimates that subsequently may be modified by the weight calculator 206 to calculate respective household-level weights for the sub-population households of the environment 100 of FIG. 1. For example, the first weight value received by the weight calculator 206 is an initial estimate for the household-level weight associated with household 102a, the second weight value received by the weight calculator 206 is an initial estimate for the household-level weight associated with the household 102b, the third weight value received by the weight calculator 206 is an initial estimate for the household-level weight associated with the household 102c, etc. In other examples, the weight calculator 206 calculates the initial estimates of for the household-level weights. The initial estimates are determined, for example, by the weight calculator 206, the AME 104, and/or another entity based on analysis of historical data of the population, other populations similar to the population, the sub-population, other populations similar to the sub-population, the households of the subpopulation (e.g., the households 102a, 102b, 102c), the demographic constraints of interest, etc.

To calculate the household-level weights associated with the sub-population households (e.g., the households 102a, 102b, 102c), the weight calculator 206 performs an iterative proportional fitting (IPF) process based on the constraint matrix 210, the target value total vector 212, and the weight vector 214. The IPF process is an iterative algorithm used by the weight calculator 206 to modify and/or adjust the weights values of the weight vector 214 such that the weight values represent household-level weights. For example, the household-level weights scale up the demographics distribution of the sub-population (e.g., represented by the constraint matrix 210) to correspond with, match, etc. the aggregate data of the population (e.g., represented by the target value total vector 212) to estimate a demographics distribution of the population. While the IPF process is described herein, other methods and/or systems (e.g., other techniques such as least squares, constrained least squares, minimum variance, etc.) may be used to calculate the household-level weights associated with the sub-population households To calculate the household-level weights, the IPF process applied by the example weight calculator 206 compares a product of the example constraint matrix 210 and the example weight vector 214 to the example target value total vector 212. If values of the product of the constraint matrix 210 and the weight vector 214 correspond with, match, etc. the aggregate data of the target value total vector 212, the example weight comparator 206 sets the weight values of the weight vector 214 as the household-level weights of the respective households. For example, the weight comparator 206 of the illustrated example may set the first weight value, $w_1$, as the household-level weight of the household 102a, may set the second weight value, $w_2$, as the household-level weight of the household 102b, and may set the third weight value, $w_3$, as the household-level weight of the household 102c.

If the product of the constraint matrix 210 and the weight vector 214 does not correspond with, does not match, etc. the target value total vector 212, the IPF process applied by the weight calculator 206 adjusts or modifies the weight values in an incremental and sequential manner. For example, the example weight calculator 206 initially applies the IPF process to modify the weight values of the weight vector 214 based on the first row of the constraint matrix 210 and the corresponding first aggregate data value of the target value total vector 212. The example weight calculator 206 identifies the non-zero elements of the first row of the constraint matrix 210. For the first row of the example constraint matrix 210 of FIG. 2, the weight calculator 206 identifies that the element of the first column (e.g., the column associated with the example household 102a) is non-zero (e.g., a value of '1'), the element of the second column (e.g., the column associated with the example household 102b) is non-zero (e.g., a value of '2'), and the element of the third column (e.g., the column associated with the example household 102c) is non-zero (e.g., a value of '1').

Because the example weight calculator 206 identifies that the element associated with the first row and the first column (e.g., the column associated with the household 102a) has a non-zero value, the weight calculator 206 applies the IPF process to adjust or modify the corresponding initial first weight value (e.g., the weight value associated with the household 102a), $w_1$, according to Equation 1 provided below to calculate a modified first weight value, $w_1'$, based on the weight vector 214, the first row of the constraint matrix 210 and the first value of the target value total vector 212.

$$w_{1'} = \frac{18000}{1 \cdot w_1 + 2 \cdot w_2 + 1 \cdot w_3 + \ldots + H_m C_1 \cdot w_m} \quad \text{Equation 1}$$

As indicated above in Equation 1, the numerator of the equation for calculating $w_1'$ is the first element of the target value total vector 212 (e.g., 18,000) and the denominator is a product of the weight vector 214 and the first row of the constraint matrix 210. Thus, to calculate the modified first weight value, the example weight calculator 206 multiples weight values of respective households by a number of members of the respective households that belong to the demographic constraint associated with the first row of the constraint matrix 210.

Further, because the example weight calculator 206 identifies that the element associated with the first row and the second column (e.g., the column associated with the household 102b) has a non-zero value, the example weight calculator 206 applies the IPF process to adjust or modify the initial second weight value (e.g., the weight value associated with the household 102b), $w_2$. According to Equation 2 provided below, the weight calculator 206 calculates a modified second weight value, $w_2'$, based on the weight vector 214, the first row of the constraint matrix 210, and the first value of the target value total vector 212.

$$w_{2'} = \frac{18000}{1 \cdot w_1 + 2 \cdot w_2 + 1 \cdot w_3 + \ldots + H_m C_1 \cdot w_m} \quad \text{Equation 2}$$

As indicated above in Equation 2, the numerator is the first element of the example target value total vector 212 (e.g., 18,000) and the denominator is a product of the example weight vector 214 and the first row of the example constraint matrix 210. Thus, to calculate the modified second weight value, the example weight calculator 206 multiples weight values of respective households by a number of members of the respective households that belong to the demographic constraint associated with the first row of the constraint matrix 210.

The example weight calculator 206 applies the IPF process to adjust or modify the other initial weight values (e.g., the third weight value associated with the household 102b, $w_3$, associated with the household 102c) associated with a non-zero element of the first row. Once the weight calculator 206 calculates the adjusted weight values associated with the non-zero elements of the first row, the weight calculator 206 replaces the identified weight values (e.g., $w_1$, $w_2$, $w_3$) with the corresponding modified weight values ($w_1'$, $w_2'$, $w_3'$) in the weight vector 214. Afterwards, the weight calculator 206 compares the product of the constraint matrix 210 and the modified weight vector 214 to the target value total vector 212. If the product and the target value total vector 212 correspond, match, etc., the weight calculator 206 sets the weight values of the modified weight vector 214 as the household-level weights.

Upon applying the IPF process to the first row of the constraint matrix 210, the example weight calculator 206 applies the IPF process to make another iteration of modifications to the weight values (e.g., $w_1'$, $w_2'$, $w_3'$, $w_4'$ ... $w_m'$) of the weight vector 214 for the second row of the constraint matrix 210 and the second element of the target value total vector 212. For example, the example weight calculator 206 identifies the non-zero elements of the second row of the constraint matrix 210. For the constraint matrix 210 of the illustrated example, the weight calculator 206 identifies that the element of the first column (e.g., the column associated with the example household 102a) is non-zero (e.g., a value of '2') and the element of the third column (e.g., the column associated with the example household 102c) is non-zero (e.g., a value of '1'). Upon identifying the non-zero elements of the second row of the constraint matrix 210, the weight calculator 206 calculates a modified first weight value, $w_1''$, according to Equation 3 provided below.

$$w_{1''} = \frac{19000}{2 \cdot w_{1'} + 0 \cdot w_{2'} + 1 \cdot w_{3'} + \ldots + H_m C_1 \cdot w_{m'}} \quad \text{Equation 3}$$

As indicated above in Equation 3, the numerator is the second element or the example target value total vector 212 (e.g., 19,000) and the denominator is a product of the example weight vector 214 and the second row of the example constraint matrix 210. Thus, to modify the weight value, the example weight calculator 206 multiples weight values of respective households by a number of members of the respective households that belong to the demographic constraint associated with the second row of the constraint matrix 210.

The example weight calculator 206 applies the IPF process to adjust or modify the other weight values (e.g., the third weight value associated with the household 102b, $w_3'$) associated with a non-zero element of the second row. Once the weight calculator 206 calculates the adjusted weight values associated with the second row, the weight calculator 206 replaces the identified weight values (e.g., $w_1'$, $w_3'$) with the modified weight values ($w_1''$, $w_3''$) in the weight vector 214. Further, the weight calculator 206 applies the IPF process to the other rows of the constraint matrix 210 (e.g., the third row, the fourth row, etc.) sequentially in a manner similar to that which was applied by the weight calculator 206 to the first row and the second row of the constraint matrix 210.

After applying the IPF process to the rows of the example constraint matrix 210, the example weight calculator 206 compares the product of the constraint matrix 210 and the example modified weight vector 214 to the example target value total vector 212. If the product and the target value total vector 212 correspond, match, etc., the weight calculator 206 sets the weight values of the modified weight vector 214 as the household-level weights. If the product of the example weight vector 214 and the example constraint matrix 210 does not correspond with, does not match, etc. the target value total vector 212 upon modifying the weight values based on the last row of the constraint matrix 210, $C_n$, and the last element of the target value total vector 212, $v_n$, the weight calculator 206 again applies the IPF process to the first row of the constraint matrix 210 and the first element of the target value total vector 212. The weight calculator 206 applies the IPF process in an incremental and sequential manner until the product of the weight vector 214 and the constraint matrix 210 corresponds with, matches, equals, etc. the target value total vector 212. At which point, the weight calculator 206 sets the weight values of the weight vector 214 as the household-level weights for the respective households. For example, the weight calculator 206 sets the weight values of the weight vector upon reaching a predetermined count of iterations (e.g., 500 iterations, 5,000 iteration, 50,000 iterations, etc.). Additionally or alternatively, the weight calculator 206 may set the weight values if a norm between the example constraint matrix 210, the example target value total vector 212, and the example weight vector 214 is less than a predetermined value and/or if a maximum absolute error between the constraint matrix 210, the target value total vector 212, and the weight vector 214 is less than a predetermined tolerance value.

To calculate a demographics distribution of the population, the example population predictor 208 of the illustrated example applies (e.g. multiplies, scales up) the household-level weights calculated by the example weight calculator 206 to the demographics data associated with the members (e.g., the example members 108a, 108b, 108c, 108d, 108e, 108f, 108g) of the respective households (e.g., the example households 102a, 102b, 102c) of the sub-population. For example, the population predictor 208 applies the household-level weights to the demographic constraints associated with the respective members that were included in the example constraint matrix 210 and/or the example target value total vector 212 (e.g., "female," "male," "young-adult," "middle-aged," and "senior" demographic constraints). Additionally or alternatively, the example population predictor 208 applies the same household-level weights to the demographic constraints associated with the respective members that were not included in the example constraint matrix 210 and/or the example target value total vector 212 (e.g., "married," "single," "high school degree," "bachelor's degree," "master's degree" and "doctorate" demographic constraints, etc.).

As an example, the example population predictor 208 of FIG. 2 applies the first household-level weight to the example demographics data 114a of the example member 108a (e.g., a middle-aged male), the example demographics data 114b of the example member 108b (e.g., a middle-aged female), and the example demographics data 114c of the example member 108c (e.g., a young-adult female); applies the second household-level weight to the example demographics data 114d of the example member 108d (e.g., a middle-aged male) and the example demographics data 114e of the example member 108e (e.g., a young-adult male); and applies the third household-level weight to the example demographics data 114f of the example member 108f (e.g., a senior female) and the example demographics data 114g of the example member 108g (e.g., a middle-aged male). Thus, the population predictor 208 of the illustrated example multiples a "middle-aged male" demographic constraint, a "middle-aged female" demographic constraint, and a "young-adult female" demographic constraint by the first household-level weight. Further, the example population predictor 208 multiples the "middle-aged male" demographic constraint and a "young-adult male" demographic constraint by the second household-level weight and multiples a "senior female" demographic constraint and the "middle-aged male" demographic constraint by the first household-level weight.

The demographics data weighted by the population predictor 208 (e.g., the demographics data 114a, 114b, 114c weighted by the first household-level weight, the demographics data 114d, 114e weighted by the second household-level weight, the demographics data 114f, 114g weighted by the third household-level weight) represent a quantity of members of the population that have the same demographics as the corresponding members (e.g., the members 108a, 108b, 108c, 108d, 108e, 108f, 108g).

For example, the example weighted demographics data 114a (e.g., a middle-aged male) indicates that the population includes a quantity of members (a count, a percentage, etc.) equivalent to the first household-level weight that have the same demographics as the member 108a; the example weighted demographics data 114d (e.g., a middle-aged male) indicates that the population includes a quantity of members (a count, a percentage, etc.) equivalent to the second household-level weight that have the same demographics as the member 108d; and the example weighted demographics data 114g (e.g., a middle-aged male) indicates that the population includes a quantity of members (a count, a percentage, etc.) equivalent to the third household-level weight that have the same demographics as the member 108g.

In other examples, if a household includes multiple members (e.g., three members) that belong to the same demographic constraint, the example population predictor 208 multiplies that demographic constraint by the household-level weight of that household and by the quantity of members that belong to that demographic constraint. For example, if the three members 108a, 108b, 108c of the household 102a belong to the "young-adult female" demographic constraint, the population predictor multiplies the "young-adult female" demographic constraint by three times the first household-weight.

The example population predictor 208 calculates a demographics distribution of the population in which each value indicates a quantity (e.g., a count, a percentage, etc.) of members of the population that belong to a corresponding demographic constraint of interest. For example, when multiple members (e.g., the members 108a, 108d, 108g) of the sub-population belong to the same demographic constraint of interest (e.g., the "middle-aged male" constraint), the example population predictor 208 calculates the value of that constraint for the demographics distribution by adding together the household-level weights that were applied to (e.g., multiplied) that demographic constraint. For example, to determine the value of the demographics distribution for the "middle-aged male" demographic constraint, the example population predictor 208 sums the first household-level weight, the second household-level weight, and the third household-level weight. Thus, the population predictor 208 of the illustrated example provides an estimate of detailed demographic characteristics (e.g., a number of young-adult males, a number of young-adult females, a number of middle-aged males, a number of middle-aged females, a number of senior males, a number of senior females, etc.) of the population based on aggregate data of the population and the demographic distribution of the sub-population.

As illustrated in FIG. 2, the population predictor 208 of the illustrated example calculates an audience measurement 216 based on the calculated household-level weights and the tuning data (e.g., the tuning data 116a, 116b, 116c of FIG. 1) associated with the respective households (e.g., the households 102a, 102b, 102c). To calculate the audience measurement 216, the population predictor 208 associates (e.g., correlates, links, affiliates, etc.) the tuning data 116a, 116b, 116c of the households 102a, 102b, 102c with the demographics data 114a, 114b, 114c, 114d, 114e, 114f, 114g of the respective members 108a, 108b, 108c, 108d, 108e, 108f, 108g of the households 102a, 102b, 102c. For example, the population predictor 208 of FIG. 2 associates the example tuning data 116a with the example demographics data 114a of the example member 108a (e.g., the "middle-aged male" demographic constraint), the example demographics data 114b of the example member 108b (e.g., the "middle-aged female" demographic constraint), and the example demographics data 114c of the example member 108c (e.g., the "young-adult female" demographic constraint). Further, the example population predictor 208 associates (e.g., correlates, links, affiliates, etc.) the tuning data 116a, 116b, 116c of the respective households 102a, 102b, 102c with the corresponding household-level weights. For example, the population predictor 208 associates the tuning data 116a of the household 102a with the first household-level weight.

To calculate the audience measurement 216 for a tuning event, the example population predictor 208 scales up the demographics data (e.g., the demographics data 114a, 114b, 114c, 114f, 114g) of the members (e.g., the members 108a, 108b, 108c, 108f, 108g) of the households (e.g., the households 102a, 102c) that include tuning data (e.g., the tuning data 116a, 116c) for the tuning event by the household-level weights (e.g., the first household-level weight, the third household-level weight) of those households. For example, to calculate the example audience measurement 216 for a media event tuned by the example household 102a, the example population predictor 208 scales up the example demographics data 114a, 114b, 114c of the example members 108a, 108b, 108c of the household 102a (e.g., the "middle-aged male" demographic constraint of the example member 108a, the "middle-aged female" demographic constraint of the example member 108b, and the "young-adult female" demographic constraint of the example member 108c) equally by the same first household-level weight.

Further, to identify a quantity (e.g., a count, a percentage) of audience members of the example audience measurement 216 belonging to a demographic constraint of interest (the "middle-aged male" demographic constraint), the example population predictor 208 adds together (e.g., sums) the household-level weights (e.g., the first household-level weight, the third household-level weight) of the households (e.g., the households 102a, 102c) that include a member of the demographic constraint of interest (e.g., the "middle-aged male" demographic constraint) and include tuning data (e.g., the tuning data 116a, 116c) associated with the tuning event of interest. Thus, by scaling up the example demographics data 114a, 114b, 114c, 114d, 114e, 114f, 114g of the example members 108a, 108b, 108c, 108d, 108e, 108f, 108g of the example households 102a, 102b, 102c that tuned to a tuning event (e.g., includes tuning data 116a, 116b, 116c for the tuning event), the population predictor 208 calculates the example audience measurement 216 of the population without having to determine which of the members 108a, 108b, 108c, 108d, 108e, 108f, 108g is responsible for the tuning event.

While an example manner of implementing the demographics estimator 122 of FIG. 1 is illustrated in FIG. 2, one or more of the elements, processes and/or devices illustrated in FIG. 2 may be combined, divided, re-arranged, omitted, eliminated and/or implemented in any other way. Further, the example sub-population determiner 202, the example population aggregator 204, the example weight calculator 206, the example population predictor 208 and/or, more generally, the example demographics estimator 122 of FIG. 2 may be implemented by hardware, software, firmware and/or any combination of hardware, software and/or firmware. Thus, for example, any of the example sub-population determiner 202, the example population aggregator 204, the example weight calculator 206, the example population predictor 208 and/or, more generally, the example demographics estimator 122 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sub-population determiner 202, the example population aggregator 204, the example weight calculator 206, the example population predictor 208 and/or, the example demographics estimator 122 is/are hereby expressly defined to include a tangible computer readable storage device or storage disk such as a memory, a digital versatile disk (DVD), a compact disk (CD), a Blu-ray disk, etc. storing the software and/or firmware. Further still, the example demographics estimator 122 of FIG. 1 may include one or more elements, processes and/or devices in addition to, or instead of, those illustrated in FIG. 2, and/or may include more than one of any or all of the illustrated elements, processes and devices.

Figure 3:
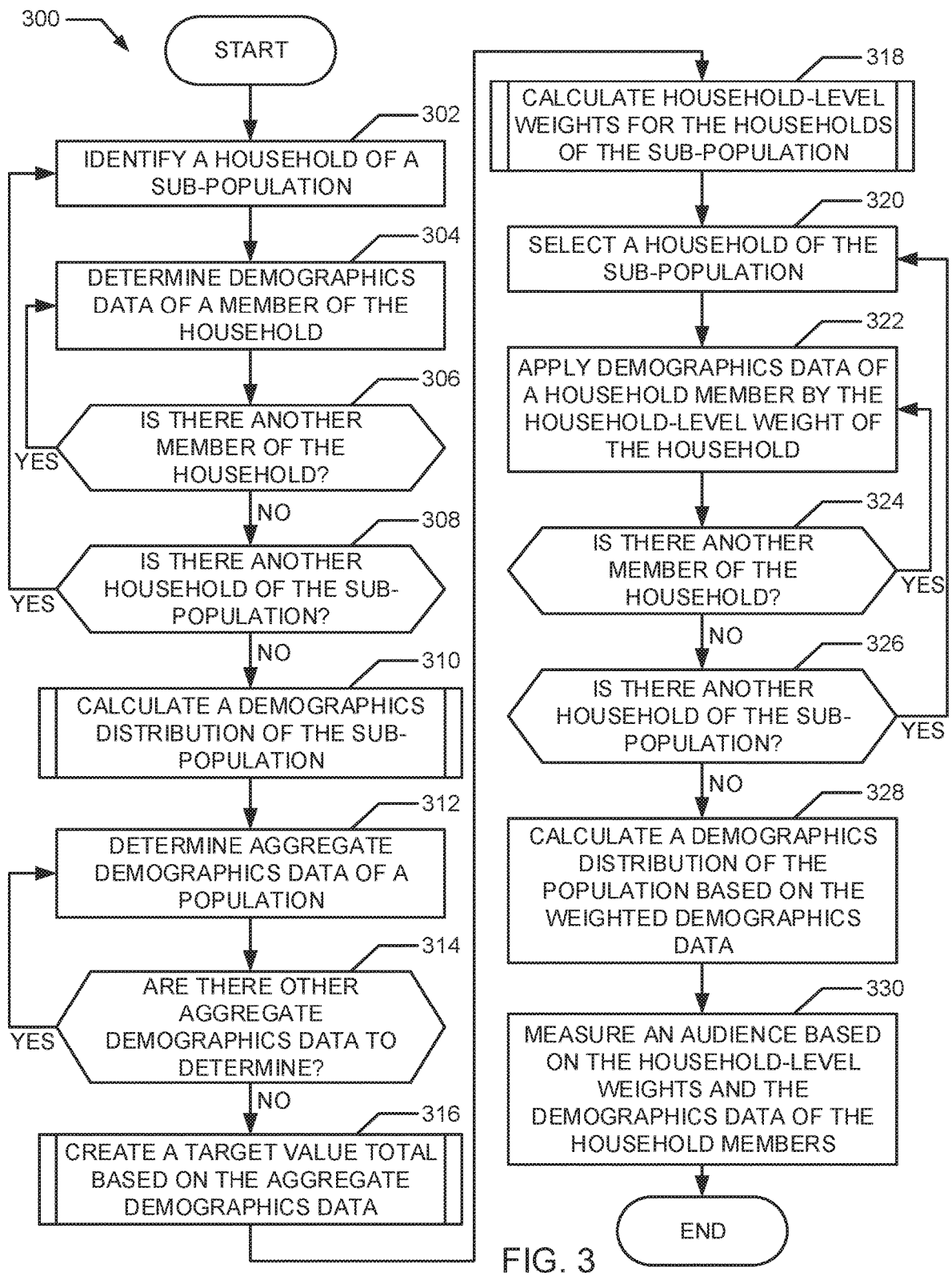
FIG. 3 is a flow diagram representative of example machine readable instructions that may be executed to implement the demographics estimator of FIGS. 1 and/or 2 to estimate a demographics distribution of a population.
Figure 4:
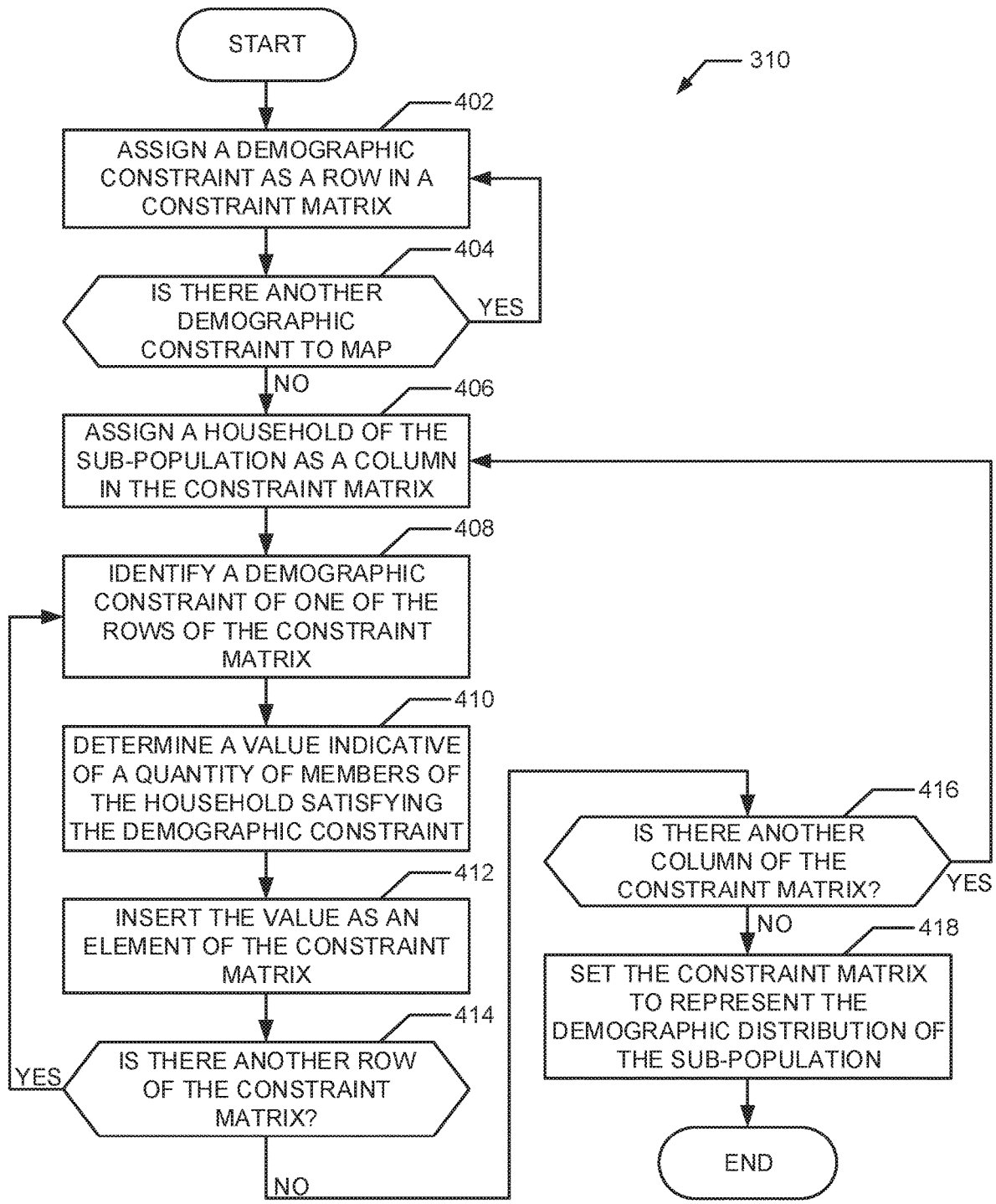
FIG. 4 is a flow diagram representative of example machine readable instructions that may be executed to implement the sub-population determiner of FIG. 2 to calculate a demographics distribution of a sub-population.
Figure 5:
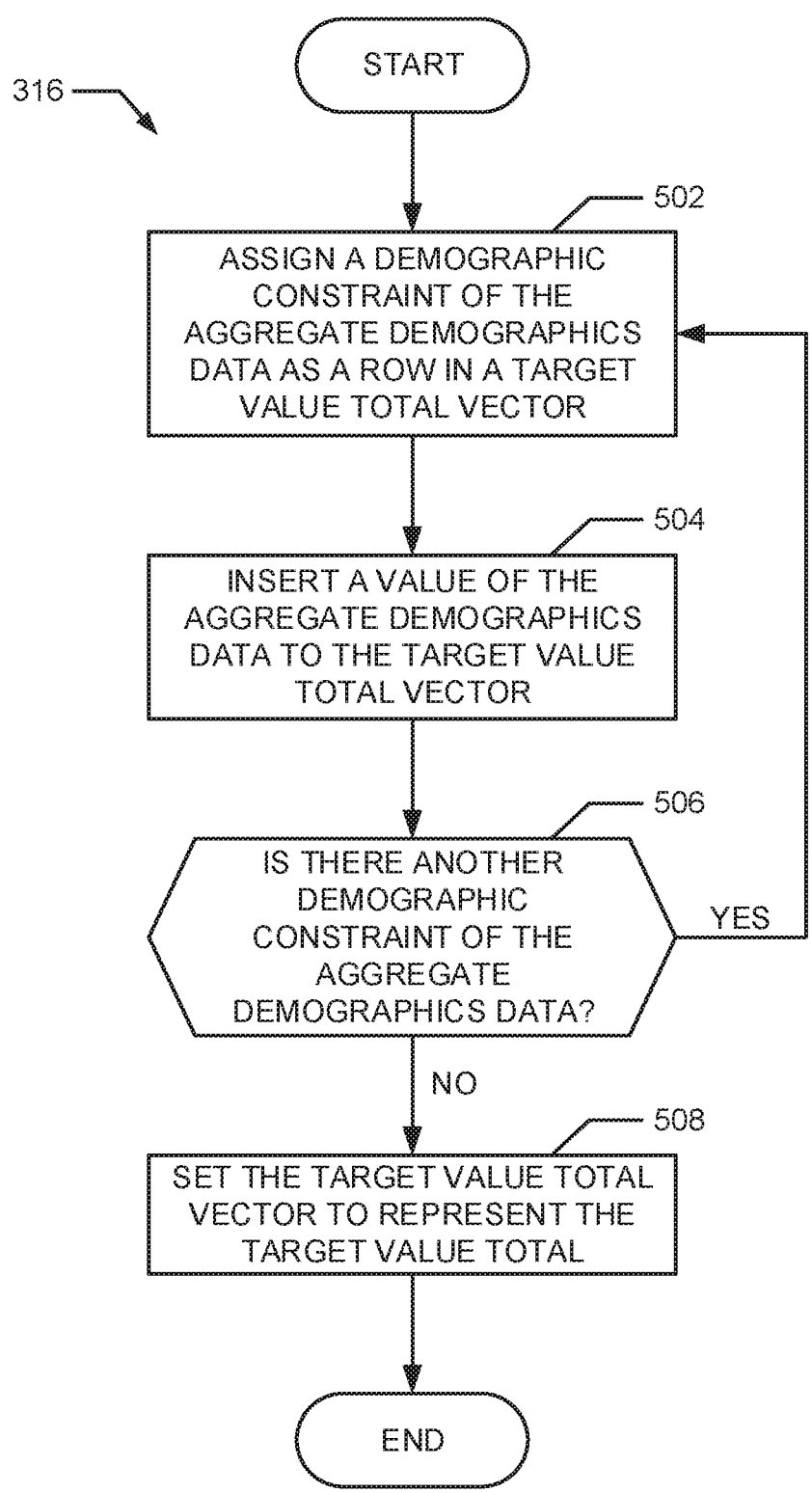
FIG. 5 is a flow diagram representative of example machine readable instructions that may be executed to implement the population aggregator of FIG. 2 to aggregate demographics of a population.
Figure 6:
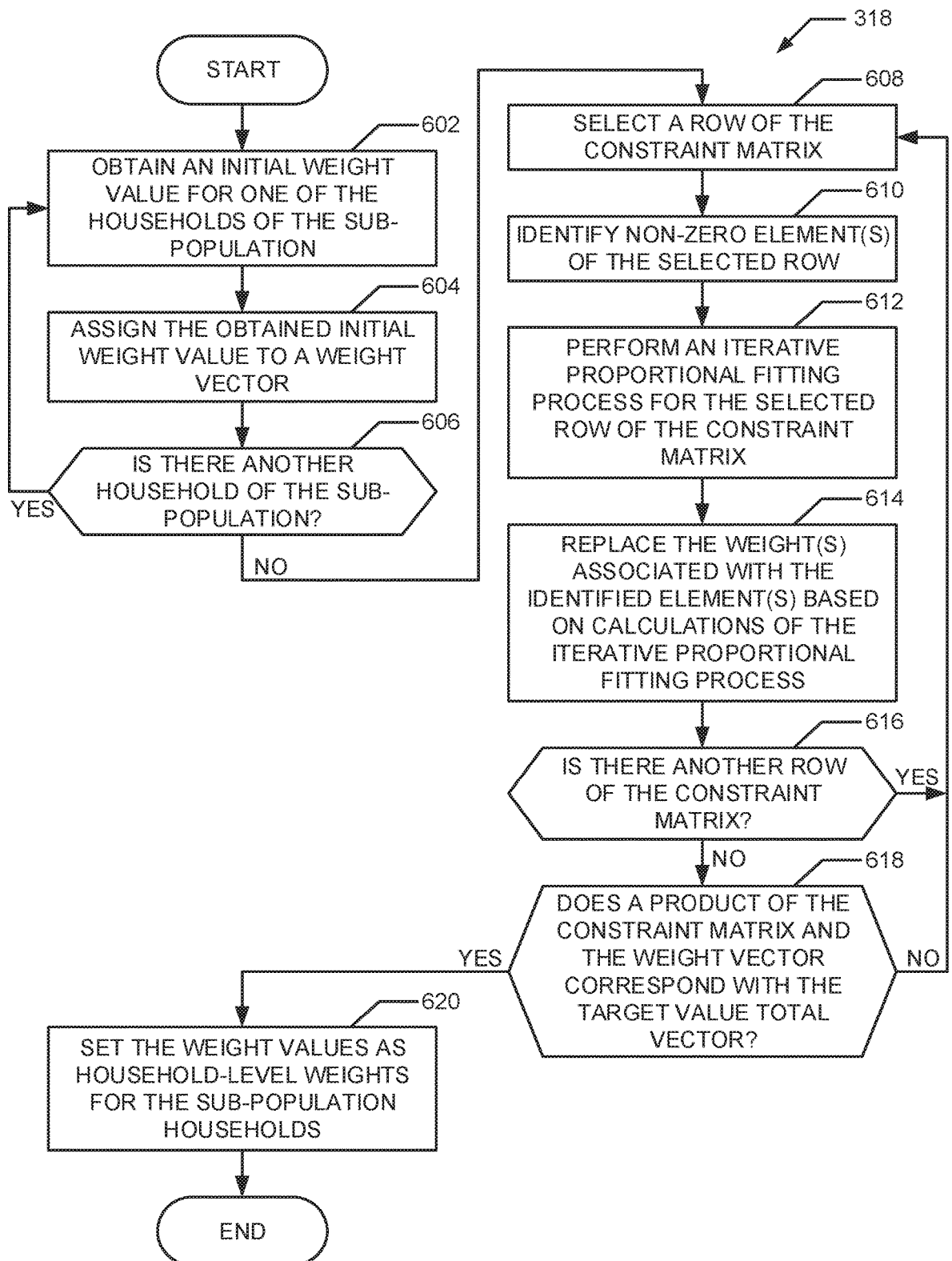
FIG. 6 is a flow diagram representative of example machine readable instructions that may be executed to implement the weight calculator of FIG. 2 to calculate household-level weights for a sub-population.

A flowchart representative of example machine readable instructions for implementing the example demographics estimator 122 of FIG. 1 and/or FIG. 2 is shown in FIG. 3. A flowchart representative of example machine readable instructions for implementing the example sub-population determiner 202 of FIG. 2 is shown in FIG. 4. A flowchart representative of example machine readable instructions for implementing the example population aggregator 204 of FIG. 2 is shown in FIG. 5. A flowchart representative of example machine readable instructions for implementing the example weight calculator 206 of FIG. 2 is shown in FIG. 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program(s) is described with reference to the flowcharts illustrated in FIGS. 3, 4, 5, and/or 6, many other methods of implementing the example demographics estimator 122 may alternatively be used. For example, the order of execution of the blocks may be changed, and/or some of the blocks described may be changed, eliminated, or combined.

As mentioned above, the example processes of FIGS. 3, 4, 5, and/or 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3, 4, 5, and/or 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is a flow diagram representative of example machine readable instructions 300 that may be executed to implement the example demographics estimator 122 of FIGS. 1 and/or 2 to estimate the demographics distribution of a population. Initially, at block 302, the example sub-population determiner 202 identifies a household of the sub-population. For example, the sub-population determiner 202 identifies the household 102a. At block 304, the example sub-population determiner 202 determines demographics data of a member of the identified household. For example, the sub-population determiner 202 collects the example demographics data 114a to determine that the example member 108a of the example household 102a of FIG. 1 belongs to the "middle-aged male" demographic constraint. In some examples, the sub-population determiner 202 collects the demographics data (e.g., the demographics data 114a, 114b, 114c, 114d, 114e, 114f, 114g of FIG. 1) from the example sub-population database 118.

At block 306, the example sub-population determiner 202 determines if there is another member of the identified household. If there is another member of the identified household, blocks 304, 306 are repeated until the sub-population determiner 202 determines the demographics data for the other members. For example, blocks 304, 306 are repeated to determine the example demographics data 114b, 114c of the other respective example members 108b, 108c of the household 102a. If there are no other members of the identified household, the sub-population determiner 202 determines whether there is another household of the sub-population (block 308). If the sub-population determiner 202 determines that there is another household of the sub-population, blocks 302, 304, 306, 308 are repeated until no other households of the identified. For example, the sub-population determiner 202 repeats blocks 302, 304, 306, 308 to identify the households 102b, 102c of FIG. 1 and the demographics data 114d, 114e, 114f, 114g of their respective members 108d, 108e, 108f, 108g.

At block 310, upon determining that no other households are included in the sub-population, the example sub-population determiner 202 calculates a demographic distribution of the sub-population. For example, to calculate the demographic distribution, the sub-population determiner 202 constructs the example constraint matrix 210 in which the columns represent respective households (e.g., the households 102a, 102b, 102c) of the sub-population, the rows represent respective demographic constraints of interest (e.g., demographic marginals, demographic joint-marginals, demographic joints, etc.), and the elements represent the values indicative of a quantity (e.g., a count, a percentage, etc.) of members of the corresponding household that belong to the corresponding demographic constraint.

At block 312, the example population aggregator 204 determines aggregate demographics data of the population. For example, the population aggregator 204 collects a total number of males of the population from the population database 120 (FIG. 1). At block 314, the example population aggregator 204 identifies whether there is other aggregate demographics data to determine. If there is other aggregate demographics data, blocks 312, 314 are repeated until no other aggregate demographics data remains. For example, the example population aggregator 204 repeats blocks 312, 314 to collect a total number of females, young adults, middle-aged adults, seniors, etc. of the population. Upon determining the aggregate demographics data of the population, the example population aggregator 204 creates a target value total based on the aggregate demographics data of the population (block 316). For example, the target value total created by the example population aggregator 204 includes aggregate demographics data for respective demographic constraints.

At block 318, the example weight calculator 206 calculates household-level weights for the identified households. For example, the weight calculator 206 calculates the first household-level weight for the example household 102a, the second household-level weight for the example household 102b, the third household-level weight for the example household 102c, etc.

At block 320, the example population predictor 208 selects a household (e.g., the example household 102a) identified by the example sub-population determiner 202 at block 302. At block 322, the example population predictor 208 applies (e.g., multiplies, scales up, etc.) the demographics data of a member of the selected household by the household-level weight associated with the selected household. For example, the example population predictor 208 multiplies the example demographics data 114a (e.g., the "middle-aged male" demographic constraint) associated with the member 108a of the household 102a by the first household-level weight associated with the example household 102a.

At block 324, the example population predictor 208 determines whether there is another member of the selected household. If the selected household has another member, blocks 322, 324 are repeated until no other members of the selected household are identified. For example, blocks 322, 324 are repeated to multiply the example demographics data 114b (e.g., the "middle-aged female" demographic constraint) associated with the example member 108b and the example demographics data 114c (e.g., the "young-adult female" demographic constraint) associated with the example member 108c of the example household 102a by the first household-level. Upon determining that there are no other members of the selected household, the example population predictor 208 determines whether there are other households of the sub-population to select (block 326). If there are other households of the sub-population, blocks 320, 322, 324, 326 are repeated by the example population predictor 208. For example, blocks 320, 322, 324, 326 are repeated to multiply (e.g., scale up) the example demographics data 114d, 114e (e.g., the "middle-aged male" demographic constraint, the "young-adult male" demographic constraint) associated with the respective example members 108d, 108e of the example household 102b by the second household-level weight and multiply (e.g., scale up) the example demographics data 114f, 114g (e.g., the "senior female" demographic constraint, the "middle-aged male" demographic constraint) associated with the respective example members 108f, 108g of the example household 102c by the third household-level weight.

At block 328, the example population predictor 208 calculates a demographics distribution of the population based on the weighted demographics data (e.g., the demographics data weighted by the household-level weights at block 322). For example, the demographics distribution of the population calculated by the population predictor 208 indicates values indicative of quantities (e.g., counts, percentages, etc.) of members of the population that belong to respective demographic constraints of interest (e.g., the "young-adult male" demographic constraint, the "young-adult female" demographic constraint, the "middle-aged male" demographic constraint, the "middle-aged female" demographic constraint, the "senior male" demographic constraint, the "senior female" demographic constraint, etc.). If multiple members (e.g., the example members 108a, 108d, 108g) of the sub-population belong to the same demographic constraint of interest (e.g., the "middle-aged male" constraint), the example population predictor 208 calculates the value for the demographic constraint of interest by adding together the household-level weights that were applied to (e.g., multiplied by) the demographic constraint of interest. For example, to determine the value of the demographics distribution for the "middle-aged male" demographic constraint, the example population predictor 208 may add together (e.g., sum) the product of the first household-level weight and the number of middle-aged males in the household 102a (e.g., '1'), the product of the second household-level weight and the number of middle-aged males in the household 102b (e.g., '1'), and the product of the third household-level weight and the number of middle-aged males in the household 102c (e.g., '1').

In some examples, the demographics distribution estimated by the demographics estimator 122 relates to the demographic constraints (e.g., females, males, young adults, middle-aged adults, seniors, etc.) utilized by the demographics estimator 122 to calculate the household-level weights. Additionally or alternatively, the example demographics estimator 122 calculates a demographics distribution of the population for other demographic constraints (e.g., demographic constraints related to other demographic dimensions such as income, race, marital-status, nationality, geographic location, education level, religion, etc.).

At block 330, the example population predictor 208 calculates the audience measurement 216 of the population based on the household-level weights and tuning data (e.g., the example tuning data 116a, 116b, 116c of FIG. 1) associated with the sub-population households (e.g., the example households 102a, 102b, 102c).

For example, to calculate the audience measurement 216, the population predictor 208 associates (e.g., correlates, links, affiliates, etc.) the tuning data of the households with the demographics data of the respective members of those households. The example population predictor 208 associates the (e.g., correlates, links, affiliates, etc.) tuning data of the households with the household-level weights of those households. Further, the example population predictor 208 scales up the demographics data (e.g., the example demographics data 114a, 114b, 114c, 114f, 114g) of the members (e.g., the example members 108a, 108b, 108c, 108f, 108g) of the households (e.g., the example households 102a, 102c) that include tuning data (e.g., the example tuning data 116a, 116c) for the tuning event of interest by the household-level weights (e.g., the first household-level weight, the third household-level weight) of those households. To calculate the audience measurement 216, the example population predictor 208 adds together (e.g., sums) the household-level weights (e.g., the first household-level weight, the third household-level weight) of the households (e.g., the households 102a, 102c) that include a member of the demographic constraint of interest and tuning data associated with the tuning event of interest.

FIG. 4 is a flow diagram representative of the example machine readable instructions 310 that may be executed to implement the example sub-population determiner 202 of FIG. 2 to calculate the demographics distribution of the sub-population. For example, the instructions 310 illustrated by the flow diagram of FIG. 4 may implement block 310 of FIG. 3. Initially, at block 402, the example sub-population determiner 202 assigns a demographic constraint as a row in the constraint matrix 210. For example, the sub-population determiner 202 assigns a demographic constraint (e.g., the "male" demographic constraint) of the demographics data (e.g., the example demographics data 114a, 114b, 114c, 114d, 114e, 114f, 114g determined at block 304 of the machine readable instructions 300 of FIG. 3) as a first row of the constraint matrix 210.

At block 404, the example sub-population determiner 202 determines whether there is another demographic constraint to assign. If there is another demographic constraint, blocks 402, 404 are repeated until no other identified demographic constraints remain. For example, blocks 402, 404 are repeated to assign the "female" demographic constraint as a second row of the example constraint matrix 210, the "young-adult" demographic constraint to a third row, the "middle-aged adult" demographic constraint to a fourth row, the "senior" demographic constraint to a fifth row, etc.

Upon determining that the demographic constraints of interest are assigned, the example sub-population determiner 202, at block 406, assigns a household of the sub-population as a column in the example constraint matrix 210. The example sub-population determiner 202 assigns the households of the sub-population identified at block 302 of the machine readable instructions 300 of FIG. 3. For example, the example sub-population determiner 202 assigns the household 102a as a first column of the constraint matrix 210.

At block 408, the example sub-population determiner 202 identifies a demographic constraint associated with one of the rows of the example constraint matrix 210. For example, the sub-population determiner 202 identifies the "male" demographic constraint of the first row of the constraint matrix 210. At block 410, the sub-population determiner 202 determines a value indicative of a quantity of members of the household assigned at block 406 that belong to the demographic constraint identified at block 408. For example, the sub-population determiner 202 determines that the example household 102a (e.g., the household assigned as the first column of the constraint matrix 210) includes one member (e.g., the example member 108a) belonging to the "male" demographic constraint (e.g., the demographic constraint assigned as the first row of the constraint matrix). At block 412, the sub-population determiner 202 inserts a value indicative of a quantity of members as an element in the constraint matrix 210 corresponding to the column associated with the selected household and the row associated with the selected demographic constraint. For example, the sub-population determiner 202 inserts a value of '1' to the element that corresponds to the column associated with the household 102a and the row associated with the "male" demographic constraint.

At block 414, the example sub-population determiner 202 identifies whether there is another row of the example constraint matrix 210. If there is another row, the sub-population determiner 202 repeats blocks 408, 410, 412, 414 for the sub-population household identified at block 406. For example, the sub-population determiner inserts the value indicative of the quantity of members of the example household 102a that belong to the "female" demographic constraint, the "young-adult" demographic constraint, the "middle-aged adult" demographic constraint, the "senior" demographic constraint, etc. as elements of the constraint matrix 210.

At block 416, upon identifying that there are no other rows of the example constraint matrix 210 for the assigned sub-population household, the example sub-population determiner 202 identifies whether there is another household of the sub-population. If there is another household of the sub-population, the sub-population determiner 202 repeats blocks 406, 408, 410, 412, 414, 416 for the other households of the sub-population (e.g., the example household 102b, the example household 102c, etc.).

At block 418, upon determining that there are no other households of the sub-population to assign in the example constraint matrix 210, the sub-population determiner 202 sets the constraint matrix 210 to represent the demographic distribution of the sub-population so that the constraint matrix 210 may be utilized by the weight calculator 206 to calculate the household-level weights.

FIG. 5 is a flow diagram representative of example machine readable instructions 316 that may be executed to implement the example population aggregator 204 of FIG. 2 to aggregate demographics of the population. For example, the instructions 316 illustrated by the flow diagram of FIG. 5 may implement block 316 of FIG. 3. Initially, at block 502, the population aggregator 204 assigns a demographic constraint associated with aggregate demographic data (e.g., the aggregate demographics data determined by or at block 312) as a row in the example target value total vector 212. For example, the population aggregator 204 assigns the "male" demographic constraint as a first row in the target value total vector 212. For example, the population aggregator 204 assigns the same demographic constraint as the first row in the target value total vector 212 as the sub-population determiner 202 assigns as the first row in the constraint matrix 210. In other examples, the population aggregator 204 assigns the demographic constraint as a column in the target value total vector 212.

At block 504, the population aggregator 204 inserts a respective value of the demographic constraint as an element of the example target value total vector 212 associated with the demographic constraint. For example, the population aggregator 204 inserts a value of '18,000' as the element of the first row of the target value total vector 212 that corresponds with the "male" demographic constraint.

Upon inserting the demographics data value in the example target value total vector 212, the example population aggregator 204, determines if there is another demographic constraint of the aggregate demographics data (block 506). If there is another demographic constraint, the population aggregator 204 repeats blocks 502, 504, 506 for the other demographic constraints. For example, the population aggregator 204 repeats blocks 502, 504, 506 for the "female" demographic constraint, the "young-adult" demographic constraint, the "middle-aged adult" demographic constraint, the "senior" demographic constraint, etc. For example, the population aggregator 204 assigns the same demographic constraint as a second row in the target value total vector 212 as the sub-population determiner 202 assigns as a second row in the constraint matrix 210, assigns the same demographic constraint as a third row in the target value total vector 212 as the sub-population determiner 202 assigns as a third row in the constraint matrix 210, etc. Upon inserting values into the target value total vector 212, the population aggregator 204 sets the target value total vector 212 to represent the target value total of block 316 so that the target value total vector 210 may be utilized by the weight calculator 206 to calculate the household-level weights (block 508).

FIG. 6 is a flow diagram representative of the example machine readable instructions 318 that may be executed to implement the example weight calculator 206 of FIG. 2 to calculate the household-level weights for the sub-population. For example, the instructions illustrated by the flow diagram of FIG. 5 may implement block 318 of FIG. 3. Initially, at block 602, the weight calculator 206 obtains an initial weight value for one of the households of the sub-population. For example, the weight calculator 206 obtains a first initial weight value, $w_1$, associated with the example household 102a. At block 604, the example weight calculator 206 inserts the obtained initial weight value to an element of the example weight vector 214. For example, the weight calculator 206 inserts the first initial weight value, $w_1$, to the element associated with a first row of the weight vector 214. At block 606, the example weight calculator 206 determines whether there is another household of the sub-population. If there is another sub-population household, the weight calculator 206 repeats blocks 602, 604, 606 for the other households to obtain and assign corresponding weight values to the weight vector 214. For example, the weight calculator 206 repeats blocks 602, 604, 606 for a second initial weight value, $w_2$, associated with the example household 102b, a third initial weight value, $w_3$, associated with the example household 102c, an initial weight value, $w_m$, associated with another household (e.g., represented below as $H_m$ in Equation 4 provided below), etc.

At block 608, upon inserting the obtained initial weight vectors into the weight vector 214, the example weight calculator 206 selects a row of the constraint matrix 210. For example, the weight calculator 206 selects the first row of the constraint matrix 210 associated with the "male" demographic constraint. At block 610, the example weight calculator 206 identifies non-zero elements of the example constraint matrix 210 (e.g., the elements inserted into the constraint matrix at block 412 of FIG. 4) of the selected row of the constraint matrix 210. For the first row of the example constraint matrix 210 of FIG. 2, the weight constructor 206 identifies that the element of the first column (e.g., the column associated with the example household 102a) is non-zero (e.g., a value of '1'), the element of the second column (e.g., the column associated with the example household 102b) is non-zero (e.g., a value of '2'), and the element of the third column (e.g., the column associated with the example household 102c) is non-zero (e.g., a value of '1').

At block 612, the example weight calculator 206 performs an iterative proportional fitting (IPF) process for the selected row of the constraint matrix 210 and the corresponding element of the target value total vector 212. For example, the weight calculator 206 performs the IPF process for the weight values of the example weight vector 214 (e.g., $w_1$, $w_2$, $w_3$) that correspond to the elements of the selected row that the weight calculator 206 identified as having non-zero values. The example weight calculator 206 performs the IPF process for the first row of the example constraint matrix 210 based on the elements of the first row that is associated with the "male" demographic constraint, the first value of the example target value total vector 212 that is associated with the "male" demographic constraint, and the weight vector 214.

The example weight calculator performs the IPF process at block 612 to calculate adjusted or modified weight values for the weight values of the example weight vector 214 that correspond to the elements of the selected row having non-zero values. For example, because the weight calculator 206 identifies that the element associated with the first row and the first column (e.g., the column associated with the household 102a) has a non-zero value, the weight calculator 206 applies the IPF process to calculate an adjusted or modified value, $w_1'$, of the initial first weight value, $w_1$, according to Equation 4 provided below.

$$w_{1'} = \frac{18000}{1 \cdot w_1 + 2 \cdot w_2 + 1 \cdot w_3 + \ldots + H_m C_1 \cdot w_m} \quad \text{Equation 4}$$

As indicated above in Equation 4, the numerator is the first value of the target value total vector 212 (e.g., 18,000) and the denominator is a product of the weight vector 214 and the first row of the constraint matrix 210. Further, because the example weight calculator 206 identifies that the elements of the first row associated with the second column and the third column has a non-zero value, the example weight calculator 206 applies the IPF process to calculate adjusted or modified values, $w_2'$ and $w_3'$, for the initial second weight value, $w_2$, and the initial third weight value, $w_3$, respectively. The example weight calculator 206 may calculate adjusted or modified value for other initial weight values that are associated with elements identified at block 610 of the row selected at block 608.

At block 614, the example weight calculator 206 modifies the weights associated with the identified elements based on calculations of the IPF process performed at block 612. For example, based on the calculations of the weight calculator 206 that are associated with the first row of the constraint matrix 210, the weight calculator 206 replaces the first initial weight value, $w_1$, with the first modified weight value, $w_1'$, in the weight vector 214; replaces the second initial weight value, $w_2$, with the second modified weight value, $w_2'$; and replaces the third initial weight value, $w_3$, with the third modified weight value, $w_3'$ in the weight vector 214.

At block 616, the example weight calculator 206 determines if there is another row of the constraint matrix 210. If there is another row, the weight calculator 206 repeats blocks 608, 610, 612, 614, for the other rows (e.g., the second row, the third row, etc.) of the constraint matrix 210. For example, the weight calculator 206 repeats 608, 610, 612, 614, to iteratively modify the weight values of the weight vector 214 based on the second rows of the constraint matrix 210 and the target value total vector 212, the second rows of the constraint matrix 210 and the target value total vector 212, etc.

If there are no other rows of the constraint matrix 210, the example weight calculator 206 determines if a product of the constraint matrix 210 and the weight vector 214 corresponds with, matches, etc. the target value total vector 212 (block 618). If the product of the constraint matrix 210 and the weight vector 214 corresponds with the target value total vector 212, the example weight calculator 206 sets the weight values of the weight vector 214 as the household-level weights associated with the respective households of the sub-population (block 620). For example, the weight calculator 206 sets the first weight value of the weight vector 214 as the first household-level weight associated with the household 102a, the second weight value as the second household-level weight associated with the household 102b, the third weight value as the third household-level weight associated with the household 102c, etc. If the product of the constraint matrix 210 and the weight vector 214 does not correspond with the target value total vector, the example weight calculator 206 repeats blocks 608, 610, 612, 614, 616, 618 to iteratively modify the weight values of the example weight vector 214 until the product of the example constraint matrix 210 and the weight vector 214 corresponds with, matches, etc. the example target value total vector 212. At which point, the weight calculator 206, at block 620, sets the weight values of the weight vector 214 as the household-level weights associated with the respective households of the sub-population.

Figure 7:
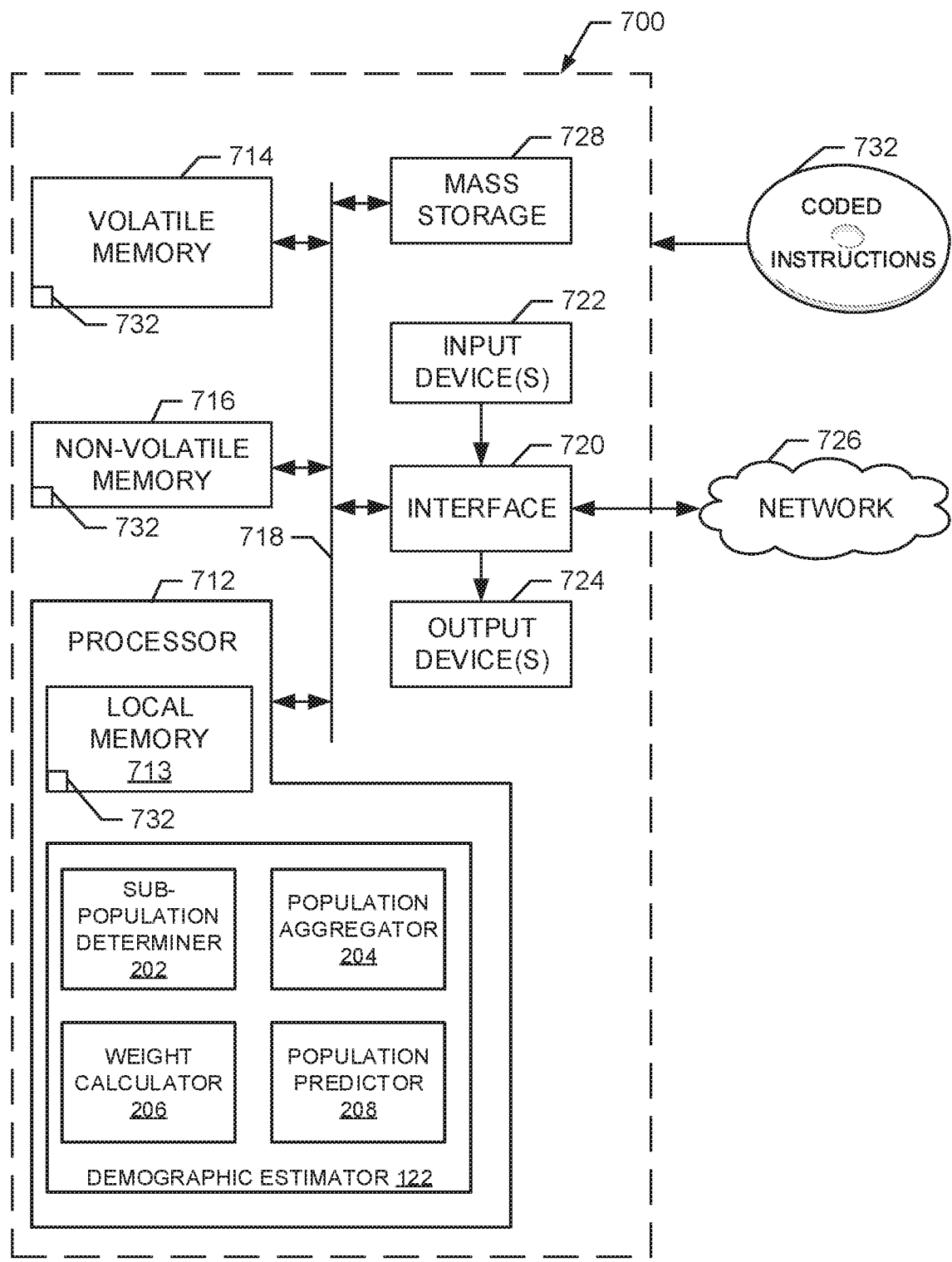
FIG. 7 is a block diagram of an example processor system structured to execute the example machine readable instructions represented by FIGS. 3, 4, 5, and/or 6 to implement the demographics estimator of FIGS. 1 and/or 2.

FIG. 7 is a block diagram of an example processor platform 700 structured to execute the instructions of FIGS. 3, 4, 5, and/or 6 to implement the demographics estimator 122 of FIG. 1. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer. The processor 712 of the illustrated example includes the sub-population determiner 202, the population aggregator 204, the weight calculator 206, the population predictor 208 and/or, more generally, the demographics estimator 122.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit(s) a user to enter data and commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 720 of the illustrated example, thus, typically includes a graphics driver card, a graphics driver chip or a graphics driver processor.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

Coded instructions 732 of FIGS. 3, 4, 5, and/or 6 may be stored in the mass storage device 728, in the volatile memory 714, in the non-volatile memory 716, and/or on a removable tangible computer readable storage medium such as a CD or DVD.

From the foregoing, it will be appreciated that the above disclosed methods, apparatus and articles of manufacture enable an audience measurement entity to accurately estimate a demographic distribution of a population by calculating household-level weights for households of a sample population. Some of the disclosed methods, apparatus and articles of manufacture reduce processing resource utilization by computing an estimate for the demographics distribution of the population without consuming computer memory and computer processing resources to calculate individual-level weights for the members of the sub-population.

Further, the above disclosed methods, apparatus and articles of manufacture enable an audience measurement entity to accurately produce audience measurements of a population for a media event based on a tuning data collected from households of a sample population (e.g., tuning events collected via computerized media presentation devices connected to a computer network to facilitate collection of the tuning events). Thus, it will be appreciated that the above disclosed methods, apparatus and articles of manufacture reduce processing resource utilization by computing a measurement of an audience of the population for the media event without collecting consumption data (e.g., collect viewing data by employing people meters) from the members of the sample population and using the data collected from the computerized media presentation devices via the computer network.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to estimate a media audience size, the apparatus comprising:
    a weight calculator to:
        calculate a first household-level weight for a first household based on (a) a demographics distribution of a sub-population of the population and (b) a target value total constructed from aggregate demographics of the population, the weight calculator to calculate the first household-level weight by performing an iterative proportional fitting based on an initial weight for the first household, the target value total, and a constraint matrix; and
    a population predictor to:
        weight (1) first demographics of a first member of the first household and (2) second demographics of a second member of the first household using the first household level weight; and
        reduce an amount of computations executed by a processor without calculating individual-level weights by estimating the media audience size based on the weighted first demographics and the weighted second demographics, wherein the weight calculator or the population predictor include a logic circuit.

2. The apparatus as defined in claim 1, wherein the weight calculator is to calculate a second household-level weight for a second household based on the demographics distribution of the sub-population and aggregate demographics of a population, the population predictor to weight (1) third demographics of a first member of the second household and (2) fourth demographics of a second member of the second household, the third demographics different from the fourth demographics, the population predictor to estimate the media audience size based on the weighted third demographics and the weighted fourth demographics.

3. The apparatus as defined in claim 1, wherein the first demographics of the first member of the first household includes a first demographic constraint associated with the first member, and the second demographics of the second member of the first household includes a second demographic constraint associated with the second member.

4. The apparatus as defined in claim 1, wherein the population predictor is to:
    associate a tuning event of the first household with the first household-level weight;
    associate the tuning event with the first demographics of the first member and the second demographics of the second member; and scale up the first demographics and the second demographics by the first household-level weight to measure the media audience of the population for the tuning event.

5. The apparatus as defined in claim 1, wherein the population predictor is to estimate the constraint matrix based on the demographics of the members of the sub-population.

6. The apparatus as defined in claim 5, further including a sub-population determiner to construct the constraint matrix by:
assigning a map to the first household as a column of the constraint matrix;
assigning a demographic constraint as a row of the constraint matrix; and
inserting a value indicative of a quantity of members of the first household associated with the demographic constraint as an element in the column and the row of the constraint matrix.

7. The apparatus as defined in claim 1, wherein the weight calculator is to reduce an amount of computations executed by the processor by measuring an audience of the population by utilizing tuning data collected from the first household of the sub-population without collecting consumption data from the members of the sub-population.

8. The apparatus as defined in claim 1, wherein the population predictor is to:
weight the first demographics of the first member by multiplying the first demographics by the first household-level weight, the weighted first demographics representing a first quantity of members of the population having the first demographics; and
weight the second demographics of the second member by multiplying the second demographics by the first household-level weight, the weighted second demographics representing a second quantity of members of the population having the second demographics.

9. A non-transitory computer-readable storage medium comprising computer-readable instructions that, when executed, cause a processor to:
calculate a first household-level weight for a first household based on (a) a demographics distribution of a sub-population of a population and (b) a target value total constructed from aggregate demographics of the population, the calculating including performing an iterative proportional fitting based on an initial weight for the first household, the target value total, and a constraint matrix;
weight (1) first demographics of a first member of the first household and (2) second demographics of a second member of the first household using the first household level weight; and
reduce an amount of computations executed by the processor without calculating individual-level weights by estimating a media audience size based on the weighted first demographics and the weighted second demographics.

10. The non-transitory computer-readable storage medium as defined in claim 9, wherein the computer-readable instructions, when executed, further cause the processor to:
calculate a second household-level weight for a second household based on the demographics distribution of the sub-population and the aggregate demographics of the population;
weight (1) third demographics of a first household member of the second household and (2) fourth demographics of a second household member of the second household, the third demographics different from the fourth demographics; and
estimate the media audience size based on the weighted third demographics and the weighted fourth demographics.

11. The non-transitory computer-readable storage medium as defined in claim 9, wherein the first demographics of the first member of the first household include a first demographic constraint associated with the first member, and the second demographics of the second member of the first household include a second demographic constraint associated with the second member.

12. The non-transitory computer-readable storage medium as defined in claim 9, wherein the computer-readable instructions, when executed, further cause the processor to:
associate a tuning event of the first household with the first household-level weight;
associate the tuning event with the first demographics of the first member and the second demographics of the second member; and
scale up the first demographics and the second demographics by the first household-level weight to estimate the media audience size for the tuning event.

13. The non-transitory computer-readable storage medium as defined in claim 9, wherein to estimate the demographics distribution, the computer-readable instructions, when executed, further cause the processor to construct the constraint matrix based on the demographics of the members of the sub-population.

14. The non-transitory computer-readable storage medium as defined in claim 13, wherein to construct the constraint matrix, the computer-readable instructions, when executed, further cause the processor to:
assign the first household as a column of the constraint matrix;
assign a demographic constraint as a row of the constraint matrix; and
insert a value indicative of a quantity of members of the first household associated with the demographic constraint as an element in the column and the row of the constraint matrix.

15. The non-transitory computer-readable storage medium as defined in claim 9, wherein to reduce the amount of computations executed by the processor, the computer-readable instructions, when executed, cause the processor to measure an audience of the population by utilizing tuning data collected from the first household of the sub-population without collecting consumption data from the members of the sub-population.

16. The non-transitory computer-readable storage medium as defined in claim 9, wherein to weight the first demographics of the first member, the computer-readable instructions, when executed, further cause the processor to multiply the first demographics by the first household-level weight; and
wherein to weight the second demographics of the second member, the computer-readable instructions, when executed, further cause the processor to multiply the second demographics by the first household-level weight, the weighted first demographics representing a first quantity of members of the population having the first demographics, the weighted second demographics representing a second quantity of members of the population having the second demographics.

17. An apparatus to estimate a media audience size, the apparatus comprising:

means for calculating a first household-level weight for a first household based on (a) a demographics distribution of a sub-population of the population and (b) a target value total constructed from aggregate demographics of the population, the calculating means to calculate the first household-level weight by performing an iterative proportional fitting based on an initial weight for the first household, the target value total, and a constraint matrix; and means for weighting (1) first demographics of a first member of the first household and (2) second demographics of a second member of the first household using the first household level weight, the weighting means to estimate a media audience size based on the weighted first demographics and the weighted second demographics, the weighting means to reduce an amount of computations executed by a processor to measure the media audience without calculating individual-level weights.

18. The apparatus as defined in claim 17, wherein the calculating means is to calculate a second household-level weight for a second household based on the demographics distribution of the sub-population and aggregate demographics of a population, the weighting means to weight (1) third demographics of a first member of the second household and (2) fourth demographics of a second member of the second household, the third demographics different from the fourth demographics, the weighting means to estimate the demographics distribution of the population based on the weighted third demographics and the weighted fourth demographics.

19. The apparatus as defined in claim 17, wherein the first demographics of the first member of the first household includes a first demographic constraint associated with the first member, and the second demographics of the second member of the first household includes a second demographic constraint associated with the second member.

20. The apparatus as defined in claim 17, wherein the weighting means is to:

associate a tuning event of the first household with the first household-level weight;

associate the tuning event with the first demographics of the first member and the second demographics of the second member; and scale up the first demographics and the second demographics by the first household-level weight to measure the media audience of the population for the tuning event.

* * * * *

UNITED STATES PATENT AND TRADEMARK OFFICE
CERTIFICATE OF CORRECTION

PATENT NO. : 10,853,824 B2
APPLICATION NO. : 16/168532
DATED : December 1, 2020
INVENTOR(S) : Sheppard et al.

It is certified that error appears in the above-identified patent and that said Letters Patent is hereby corrected as shown below:

In the Claims
Column 34, Line 25, Claim 1:
After "sub-population of" replace "the" with --a--.
Column 37, Line 5, Claim 17:
After "sub-population of" replace "the" with --a--.

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*